United States Patent [19]
Hsiao et al.

[11] Patent Number: 5,978,183
[45] Date of Patent: Nov. 2, 1999

[54] HIGH RESOLUTION LEAD TO SHIELD SHORT-RESISTANT READ HEAD

[75] Inventors: Richard Hsiao, San Jose; Tsann Lin, Saratoga; Hugo Alberto Emilio Santini, San Jose, all of Calif.

[73] Assignee: International Business Machines Corporation, Armonk, N.Y.

[21] Appl. No.: 08/988,812

[22] Filed: Dec. 11, 1997

[51] Int. Cl.[6] .................................................. G11B 5/39
[52] U.S. Cl. .................................................. 360/113
[58] Field of Search .................................. 360/113, 119, 360/120, 125; 324/207.21, 252; 365/8, 157, 158; 338/32 R, 32 H

[56] References Cited

U.S. PATENT DOCUMENTS

| | | | |
|---|---|---|---|
| 4,949,207 | 8/1990 | Lazzari | 360/119 |
| 5,073,242 | 12/1991 | Hamilton | 204/192.22 |
| 5,103,553 | 4/1992 | Mallary | 360/113 |
| 5,256,249 | 10/1993 | Hsie et al. | 156/656 |
| 5,287,237 | 2/1994 | Kitada et al. | 360/113 |
| 5,479,696 | 1/1996 | McNeil | 360/113 |
| 5,515,221 | 5/1996 | Gill et al. | 360/126 |
| 5,557,492 | 9/1996 | Gill et al. | 360/113 |
| 5,568,335 | 10/1996 | Fontana et al. | 360/113 |
| 5,617,277 | 4/1997 | Chen et al. | 360/113 |
| 5,675,459 | 10/1997 | Sato et al. | 360/113 |
| 5,696,656 | 12/1997 | Gill et al. | 360/113 |
| 5,850,324 | 12/1998 | Wu et al. | 360/113 |

FOREIGN PATENT DOCUMENTS

| | | |
|---|---|---|
| 5-325138 | 12/1993 | Japan . |
| 8-55310 | 2/1996 | Japan . |
| 8-287427 | 11/1996 | Japan . |

Primary Examiner—David L. Ometz
Attorney, Agent, or Firm—Gray Cary Ware Freidenrich

[57] ABSTRACT

An MR read head has first and second lead layers protected by first, second and third insulation layers in addition to the first and second insulative gap layers substantially all the way from the side edges of an MR sensor to terminals. The first and second insulation layers do not extend outside of the first and second lead layer sites so that greater heat dissipation can be realized from the MR sensor. Each lead layer comprises first and second lead layer films. Where these films overlap for electrical connection their top and bottom surfaces are protected by the first and second insulation layers and their edges are protected by the third insulation layer. Where the first lead layer film extends from the second lead layer film toward the respective terminal its bottom surface is protected by the first insulation layer and its top surface and its side edges are protected by the third insulation layer. Only three masks are required for fabricating or constructing these components. The first liftoff mask is employed for defining the first insulation layer and the first lead layer film. The second liftoff mask is employed for depositing the second lead layer film on the first lead layer film with an end of the second lead layer film for defining the track width of the MR sensor and making a contiguous junction with a respective side edge of the MR sensor and then depositing a second insulation layer on the second lead layer film. A third liftoff mask is employed for masking the MR sensor site and the second lead layer film of the first and second lead layers so that the height of the MR sensor can be defined and the third insulation layer deposited.

21 Claims, 29 Drawing Sheets

HIGH RESOLUTION LEAD TO SHIELD SHORT-RESISTANT READ HEAD

BACKGROUND OF THE INVENTION

1. Field of the Invention

The present invention relates to a method of making a high resolution, lead to shield short-resistant magnetic head, and, more particularly, to a read head with a very small read gap for high resolution and insulation layers that are substantially aligned with first and second leads for preventing shorting of the leads to first and second shield layers.

2. Description of Related Art

An MR read head includes an MR sensor positioned between first and second non-magnetic gap layers which, in turn, are positioned between first and second shield layers. The resistance of the MR sensor changes in response to magnetic fields on circular tracks of a rotating disk. A sense current conducted through the MR sensor results in voltage changes that are detected by processing circuitry as readback signals. The MR sensor may be an anisotropic MR (AMR) sensor, or a spin valve sensor.

A spin valve sensor includes a spacer layer, positioned between a pinned layer and a free layer. First and second lead layers are connected to side edges of the spin valve sensor for conducting a sense current therethrough. The magnetization of the pinned layer is pinned at 90° to the magnetization of the free layer, and the magnetization of the free layer is free to respond to magnetic fields from the rotating disk. The magnetization of the pinned layer is typically pinned by exchange coupling with an antiferromagnetic layer. A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor.

Each lead layer has an end edge that may abut a respective side edge of the MR sensor to form what is known in the art as a contiguous junction. The distance between contiguous junctions in an MR read head defines the track width of the head. A hard magnetic layer typically underlies each lead layer and includes an end edge that abuts a respective side edge of the MR sensor. The hard magnetic layer, also known as a hard bias layer, longitudinally biases the MR sensor, stabilizing its magnetic domains to prevent Barkhousen noise. In another type of junction, each lead layer and bias layer overlap a portion of the MR sensor, forming a continuous junction. The track width of an MR read head with continuous junctions is defined by the distance between the overlapping portions. The contiguous junction configuration is preferred to the continuous junction configuration because one masking step can be employed for defining the track width of the MR sensor, as well as for depositing the bias layer and leads that form the contiguous junctions.

The areal or bit density of an MR read head is determined by its track width and read gap. Track width defines the tracks per inch of recording medium (track density) and the read gap defines the bits per inch along a track (linear density). From these parameters the bits able to be read per square inch of recording medium can be determined. In the construction of an MR read head, it is easier to increase track density than linear density. In order to maximize linear density, the first and second gap layers at the top and the bottom of the MR sensor must be extremely thin. For instance, for a 10 Gb/in$^2$ spin valve read head, the total read gap should be about 150 nm. With an MR structure thickness of about 35 nm this leaves about 115 nm to be divided between the first and second gap layers. Such gap layers are not sufficiently thick to protect the lead layers from electrical shorts. Because of the large area of the lead layers there is a high risk that the gap layers will have pin holes that permit shorting to the first and second shield layers. This has a serious impact on manufacturing yield.

One way to minimize shorts is to deposit additional insulation material outside the sensor frame. This can be accomplished by depositing a layer of insulation immediately on top of the first gap layer, outside the sensor frame, and depositing another layer of insulation, outside the sensor frame, just before the second gap layer is formed. This leaves only the first and second gap layers within the sensor frame, but thickens up the insulation outside the sensor frame where the lead layers extend to the terminals. Unfortunately, a portion of each lead layer between the contiguous junction and the additional insulation layers is protected only by the first and second gap layers, which leaves that portion at risk of shorting to a shield layer. Another problem with this arrangement is that the additional insulation layers thermally insulate the MR sensor, thereby increasing the risk that heating of the MR sensor will alter magnetic moments of its magnetized layers. Still another problem is that a masking step is required for each of the two additional insulation layers. Each masking step requires that a vacuum be broken in a deposition chamber so that a wafer with rows and columns of heads can be removed for masking. Photoresist is spun on the wafer, exposed with light having a desired pattern, and then developed to remove the exposed portion or portions where material is to be deposited. Each time the wafer is taken out of the deposition chamber, the exposed surfaces of any metallic layers are oxidized which lessens the adherence between metallic and insulation layers.

In addition to the two masking steps required for the two insulation layers, at least three additional masking steps are required to construct the MR sensor and the leads. After the first masking step, a second masking step is required to define the side edges of the MR sensor and a first lead layer film portion of each lead layer. A third masking step is then employed to define the height of the MR sensor by removing all MR sensor material not removed by the second masking step. A fourth masking step is then employed to deposit a second lead layer film portion for each lead layer that is electrically connected to and extends from the first lead layer film portion to one of the terminals. A fifth masking step is then employed for depositing the second insulation layer discussed hereinabove. With this arrangement five masking steps are required to complete just the MR sensor and the insulation layers.

SUMMARY OF THE INVENTION

The present invention provides a method of making an MR read head that has a narrow read gap and yet has a minimum amount of insulation other than where the first and second lead layers are located. Before construction of the read head there are an MR sensor site and first and second lead layer sites where the MR sensor and first and second lead layers are to be constructed. At substantially only each lead layer site, the lead layer is sandwiched between first and second insulation layers and the first and second insulation layers are sandwiched between the first and second insulative gap layers. The first and second insulation layers are virtually non-existent outside of the lead layer sites, which enhances heat dissipation from the MR sensor. Each lead layer comprises at least two lead layer films, a first lead layer film being located below a second lead layer film and being spaced from a respective side edge of the MR sensor, and the second lead layer film having an end which abuts a respective side edge of the MR sensor to form a contiguous junction therewith. Along with the second lead layer film there may be a hard bias layer for longitudinally biasing the MR sensor, as described hereinabove.

Where the second lead layer film overlaps the first lead layer film for making electrical connection therewith, the overlapping portions of the first and second lead layer films are sandwiched between the first and second insulation layers. With this arrangement, the first lead layer film can be positioned closely to the respective side edge of the MR sensor and still be protected by the first and second insulation layers. Heretofore lead layer portions close to the side edges of the MR sensor were only protected by the first and second insulative gap layers. Any first lead layer film portion that extends from the overlapping portion of the first and second lead layer films to respective one of the terminals is sandwiched between first and third insulation layers which, in turn, are sandwiched between the first and second insulative gap layers. Accordingly, substantially the full length of each lead layer is protected by top and bottom insulation layers which, in turn, are sandwiched between the first and second insulative gap layers. Further, the overlapping portion of the first and second lead layer films has side edges which are protected by the third insulation layer so that the overlapping portions of the first and second films are bounded by the first and second insulation layers at the bottom and the top and by the third insulation layer along their sides. In another embodiment of the invention, a spin valve sensor has a dielectric antiferromagnetic layer that extends from the MR sensor below the first insulation layer, further increasing the insulation between the first lead layer films and the first shield layer.

The process of making the MR read head requires only three masking steps for making the MR sensor, the first and second lead layer films, and the first and second insulation layers, in contrast to five masking steps required for the process described hereinabove. In the present process, the two masking steps required to form the additional insulation layers outside of the MR sensor frame are omitted. In the present invention, the first masking step is employed for depositing the first insulation layer on the first insulative gap layer and depositing the first lead layer film on the first insulation layer, with the first lead layer film having an end slightly spaced from a respective side edge of the MR sensor. The first insulation layer and the first lead layer film are located substantially entirely within a respective lead layer site. The first lead layer preferably extends from near a respective side edge of the MR sensor all the way to a respective terminal. A second mask is then employed for depositing a second lead layer film over at least a portion of the first lead layer film and a second insulation layer on top of the second lead layer film, with the second lead layer film having an end that abuts a respective side edge of the MR sensor to form a contiguous junction therewith. Before deposition of the second insulation layer, a hard bias film may also be deposited that has an end that abuts the respective side edge of the MR sensor for longitudinally biasing the MR sensor. A third mask is then employed for defining a height of the MR sensor and for depositing a third insulation layer which covers any first lead layer film that extends from the second lead layer film, side edges of the lead layer films, the insulation layers and other areas of the head other than the MR sensor and the overlapping surface portions of the first and second lead layer films.

An object of the present invention is to provide a method of making an MR read head with a narrow read gap and a minimum amount of insulation.

Another object is to provide an MR read head wherein first and second lead layers are bounded by a combination of first, second and third insulation layers, and wherein the first and second insulation layers are located only at lead layer sites.

A further object is to provide an MR read head wherein the interface between the insulation and lead layer is free of oxidation.

Still another object is to provide an MR read head wherein first and second short protective insulation layers extend almost to a respective side edge of the MR sensor.

Still a further object is to provide a spin valve sensor type read head wherein a dielectric antiferromagnetic layer of the spin valve sensor is employed for providing extra insulation between a first lead layer film and a first shield layer.

Still another object is to provide a method for making an MR read head which requires only three masking steps for making the MR sensor, the first and second lead layers and insulation layers.

Still a further object is to provide a method of making an MR read head using masking steps for aligning insulation layers with the lead layer films of lead layers.

Still another object is to provide a method of making a spin valve read head wherein a dielectric antiferromagnetic layer of the spin valve is aligned, after a masking step, with a first insulation layer that protects a first lead layer film from shorting to the first shield layer.

Other objects and attendant advantages of the invention will be appreciated upon reading the following description taken together with the drawings.

DESCRIPTION OF THE PREFERRED EMBODIMENTS

Magnetic Disk Drive

Figure 1:
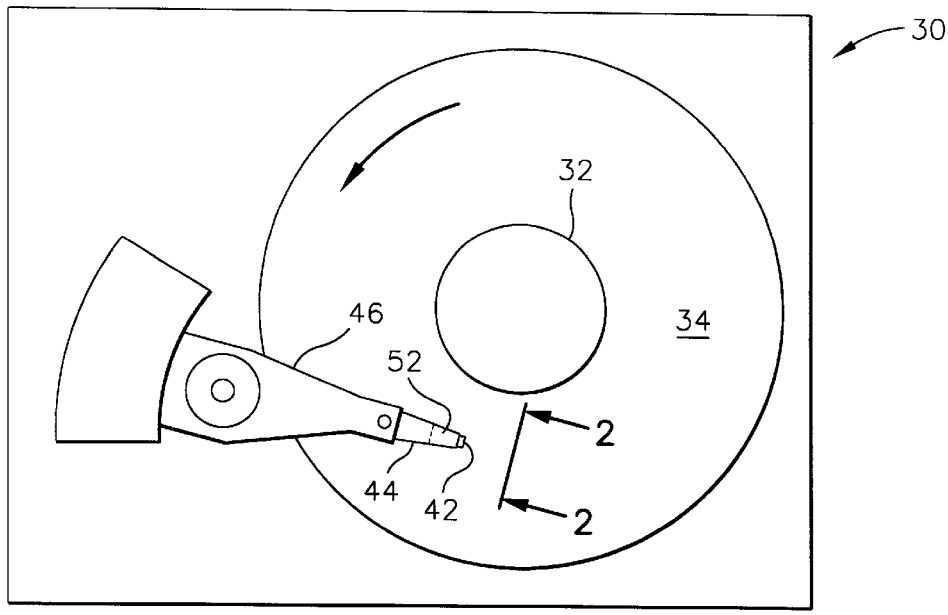
FIG. 1 is a planar view of an exemplary magnetic disk drive.
Figure 2:
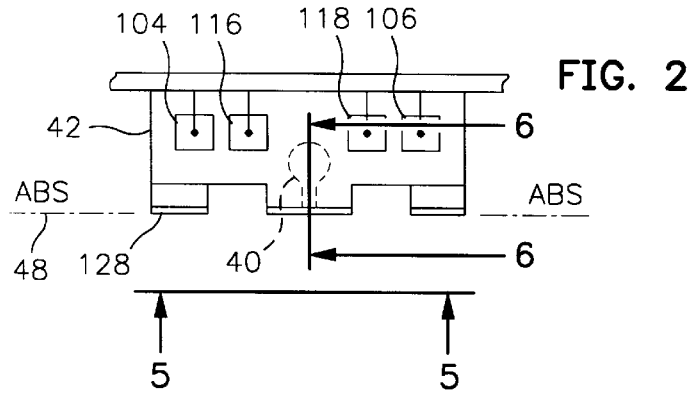
FIG. 2 is an end view of a slider with a magnetic head of the disk drive as seen in plane 2—2.
Figure 3:
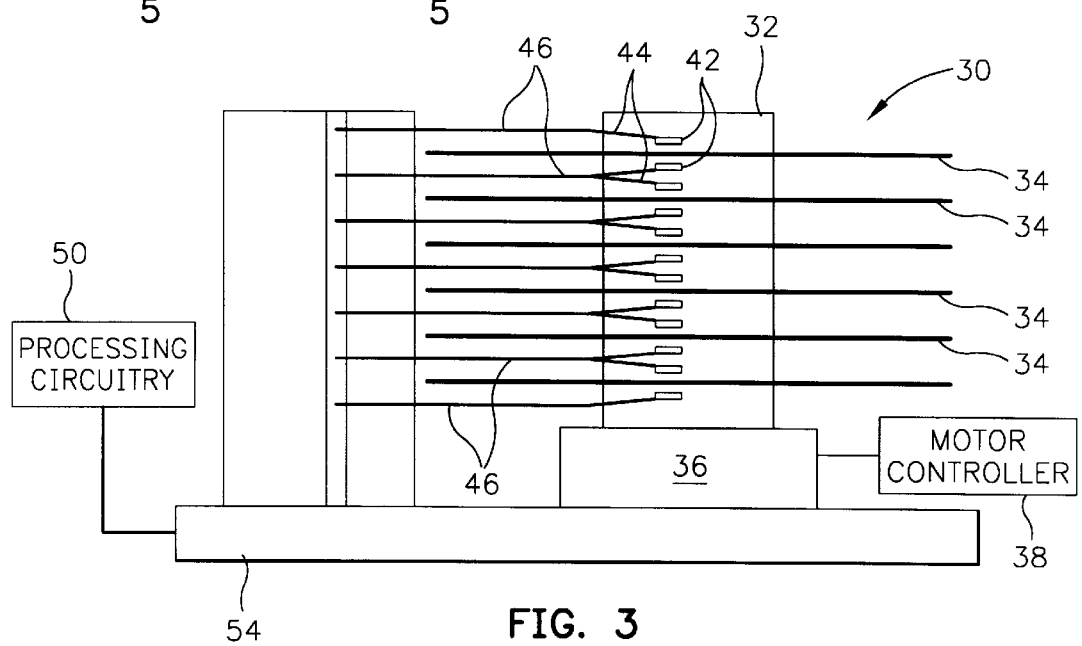
FIG. 3 is an elevation view of the magnetic disk drive wherein multiple disks and magnetic heads are employed.
Figure 4:
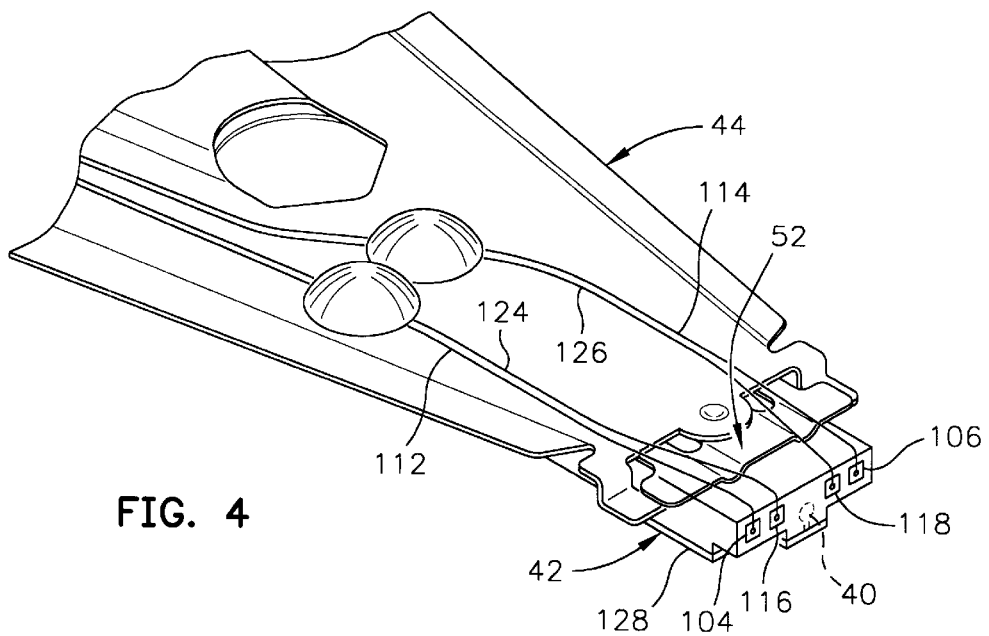
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36, the slider is supported on a thin (typically, 0.05 $\mu$m) cushion of air (air bearing) between the surface of the disk 34 and an air bearing surface (ABS) 48. The magnetic head 40 may then be employed for writing information to multiple circular tracks on the surface of the disk 34, as well as for reading information therefrom. Processing circuitry 50 exchanges signals representing such information with the head 40, provides motor drive signals for rotating the magnetic disk 34, and provides control signals for moving the slider to various tracks. In FIG. 4 the slider 42 is shown mounted to a head gimbal assembly (HGA) 52 which, in turn, is mounted to the suspension 44. The components described hereinabove may be mounted on a frame 54, as shown in FIG. 3.

Figure 5:
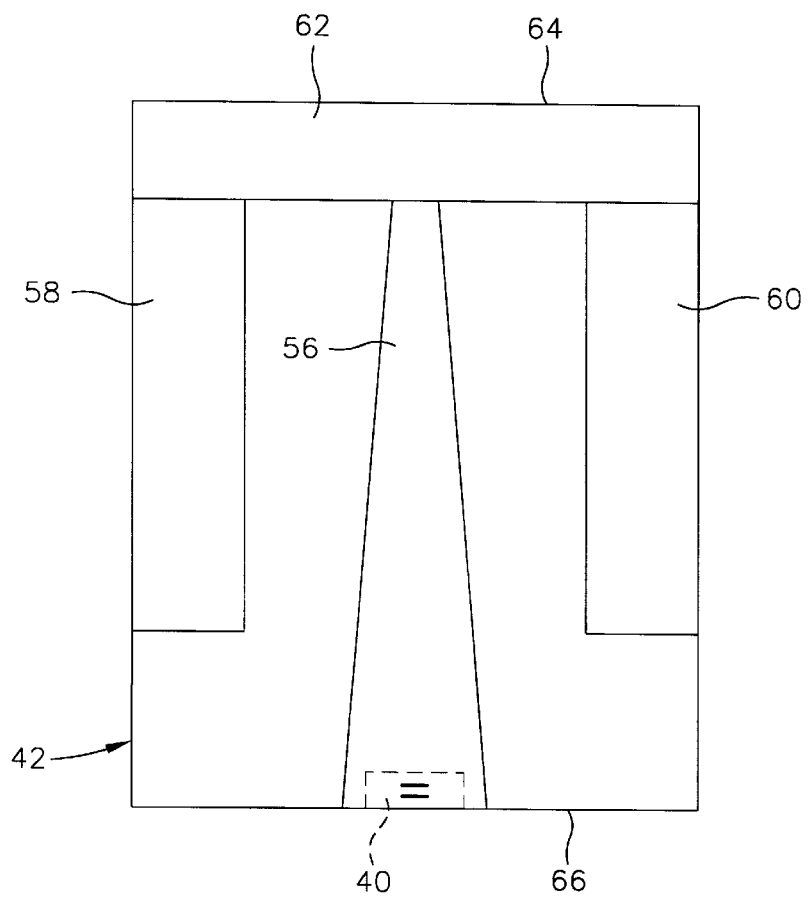
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
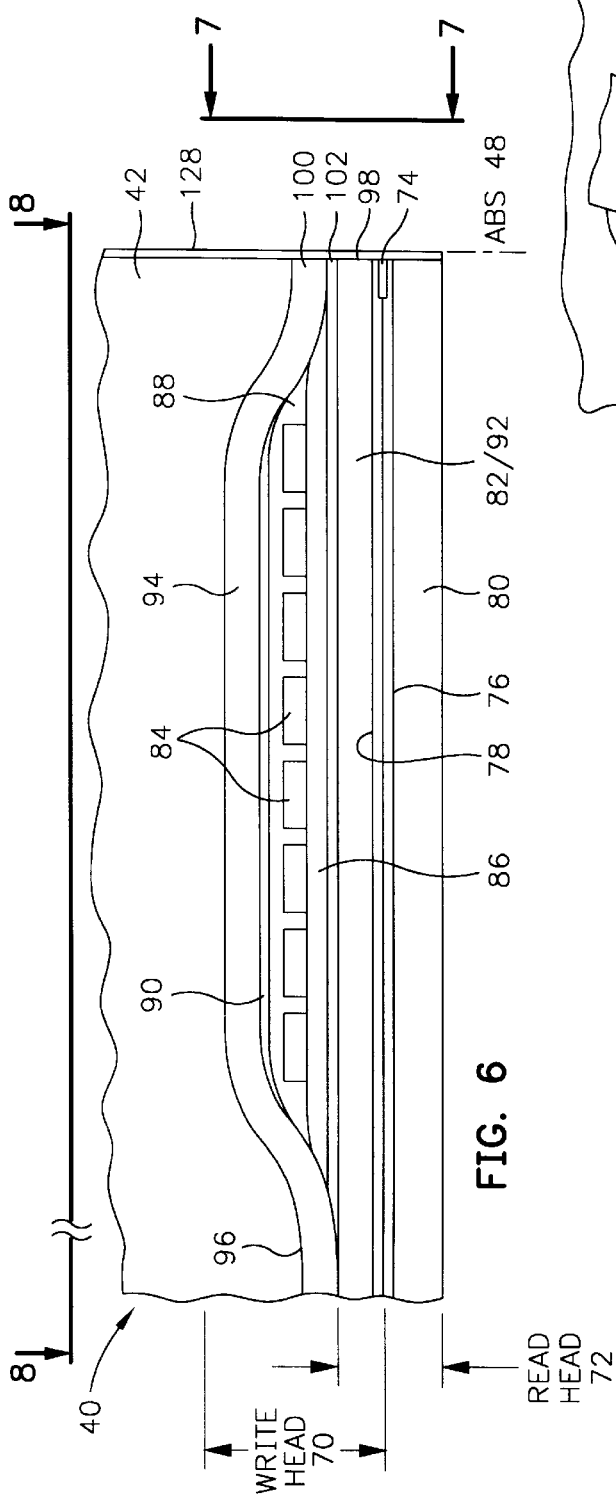
FIG. 6 is a partial view of the slider and magnetic head as seen in plane 6—6 of FIG. 2.
Figure 7:
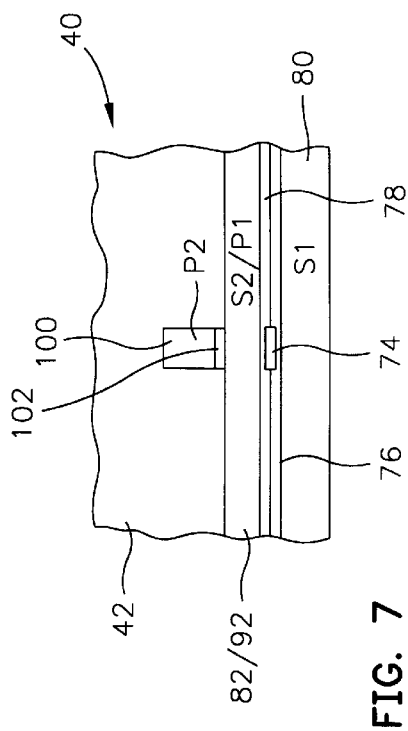
FIG. 7 is a partial ABS view of the slider taken along plane 7—7 of FIG. 6 to show the read and write elements of the magnetic head.

FIG. 6 is a side cross-sectional elevation view of the merged MR head 40, which has a write head portion 70 and a read head portion 72, the read head portion employing a spin valve sensor 74 of the present invention. Optionally, the sensor may be an AMR sensor. FIG. 7 is an ABS view of FIG. 6. The spin valve sensor 74 is sandwiched between first and second gap layers 76 and 78 and the gap layers are sandwiched between first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 8:
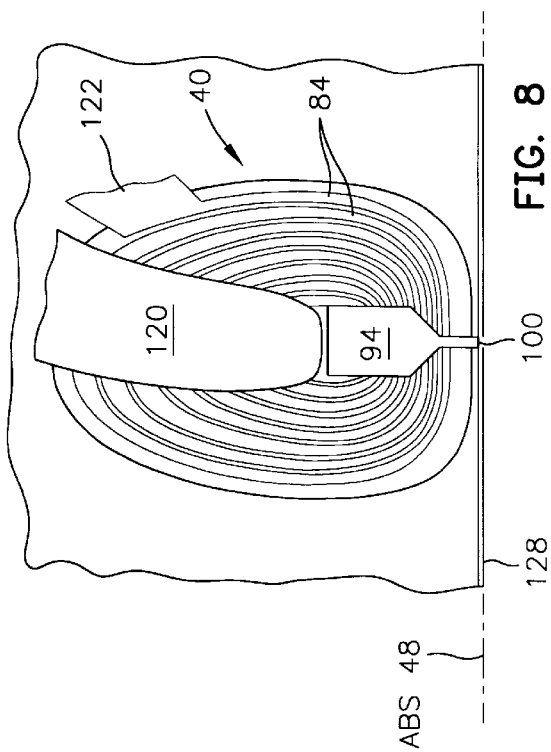
FIG. 8 is a view taken along plane 8—8 of FIG. 6 with all material above the second pole piece removed.

The write head portion of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7.

FIGS. 9–24 illustrate a previous method of making an MR read head and FIGS. 25–60 illustrate the present process for making the present MR read head. In both methods, ion beam deposition or sputter deposition is employed for depositing the metal and insulation layers. The masks are preferably bilayer photoresist layers wherein a bottom photoresist layer is recessed from a top photoresist layer so that a dissolvent can dissolve the bottom layer, thereby permitting the mask to be lifted from the wafer carrying with it the sputtered material deposited thereon. Stippled layers are insulation layers and heavy lines show the outlines of the masks. L(B) represents a first or bottom lead layer film for the first lead layer and L(T) represents a second or top lead layer film for the first lead layer. While the lead layers L(B) and L(T) are described primarily in reference to a first lead, these layers apply equally as well to a second lead. S1 and S2 designate first and second shield layers and G1 and G2 designate first and second read gap layers.

Figure 9:
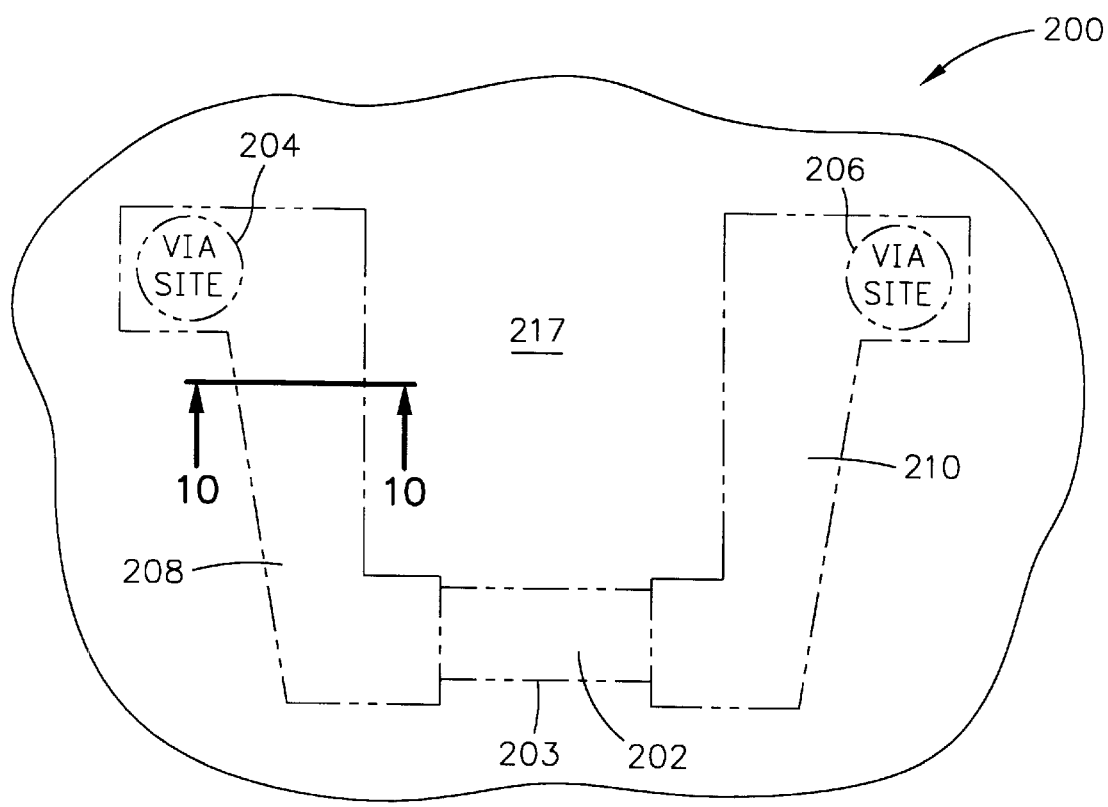
FIG. 9 is a plan view of a first insulative gap layer deposition step of a previous method.
Figure 10:
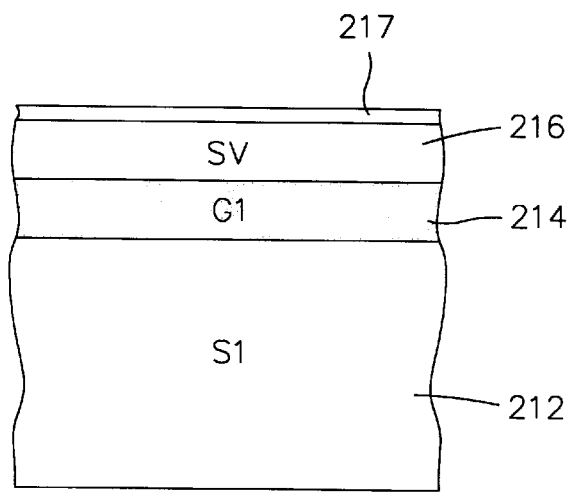
FIG. 10 is a view taken along plane 10—10 of FIG. 9.
Figure 11:
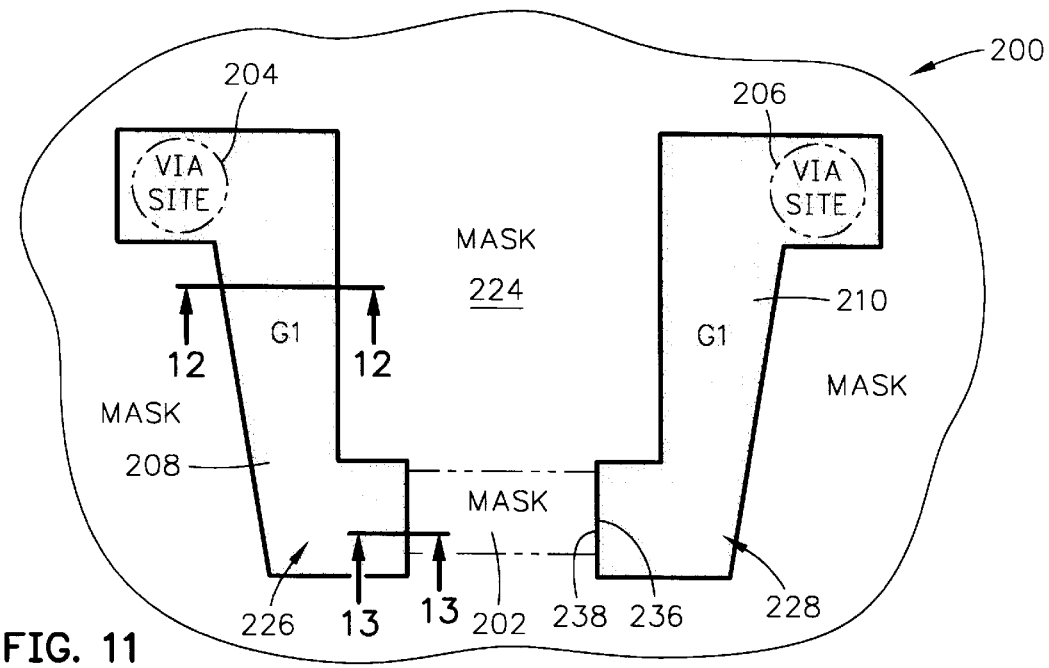
FIG. 11 is a cross-sectional view taken along plane 11—11 of FIG. 9.

FIG. 9 is a plan view of a portion 200 of a wafer where a magnetic MR read head is to be constructed along with other MR read heads (not shown) arranged in rows and columns (not shown) on the wafer. The wafer portion 200 shows an MR site 202, first and second via sites 204 and 206, and first and second lead layer sites 208 and 210 which electrically connect side edges of the MR sensor to the via sites. Each via site 204 and 206 is a vertically disposed (out of paper) electrical conductor connecting a lead to a respective terminal (see 104 and 106 in FIG. 2). As shown in FIG. 10, a first shield layer 212, a first gap layer 214 and an MR material layer 216 have been formed while as shown in FIG. 11, the first shield layer 212, the first insulative gap layer 214, a first insulation layer 218 and the MR material layer 216 have been formed. In this process, a first mask (not shown) was employed for constructing the first insulation layer 218 on top of the first gap layer 214 behind the MR sensor site along line 222. The purpose of the first insulation layer 218 is to provide extra insulation for the first and second lead layers that are to be constructed at the lead layer sites 208 and 210. The extra insulation prevents shorting of the leads through pinholes in the first gap layer 214 to the first shield layer 212. It should be noted that a front portion of each lead layer site below line 222 is left unprotected by the first insulation layer 218.

Figure 12:
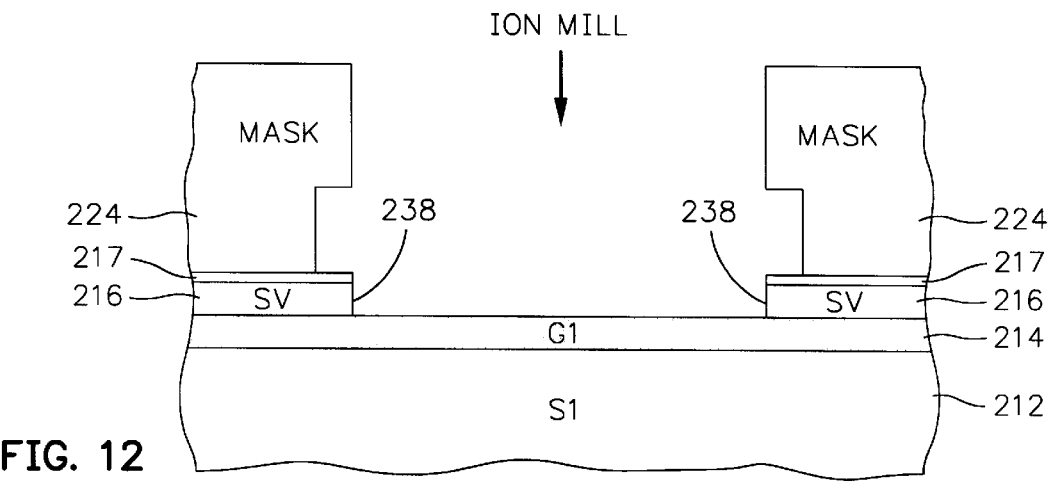
FIG. 12 is a plan view of a wafer wherein a mask is employed for defining the track width of the MR sensor and for depositing hard bias and first lead layer films of first and second lead layers of a previous MR read head.
Figure 13:
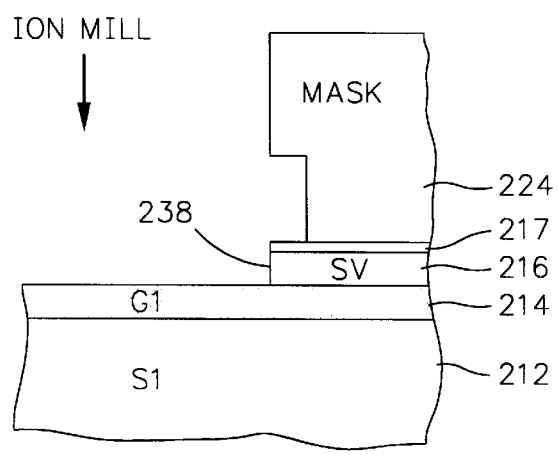
FIG. 13 is a view taken along plane 13—13 of FIG. 12.
Figure 14:
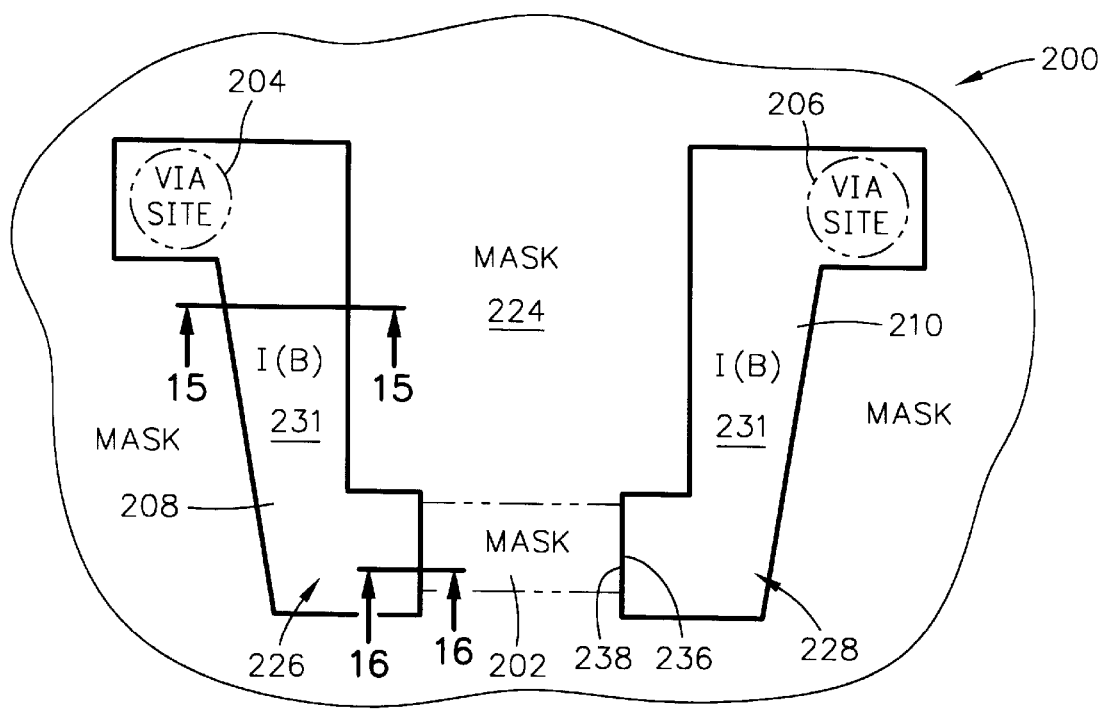
FIG. 14 is a cross-sectional view taken along plane 14—14 of FIG. 12.
Figure 15:
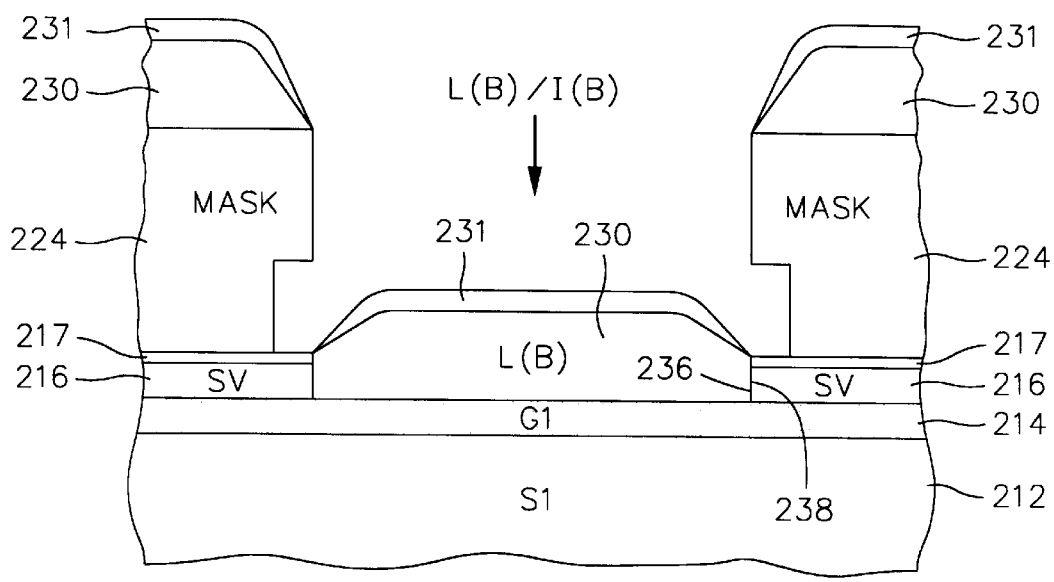
FIG. 15 is a plan view of a wafer wherein a mask is employed for defining the height of the previous MR sensor.
Figure 16:
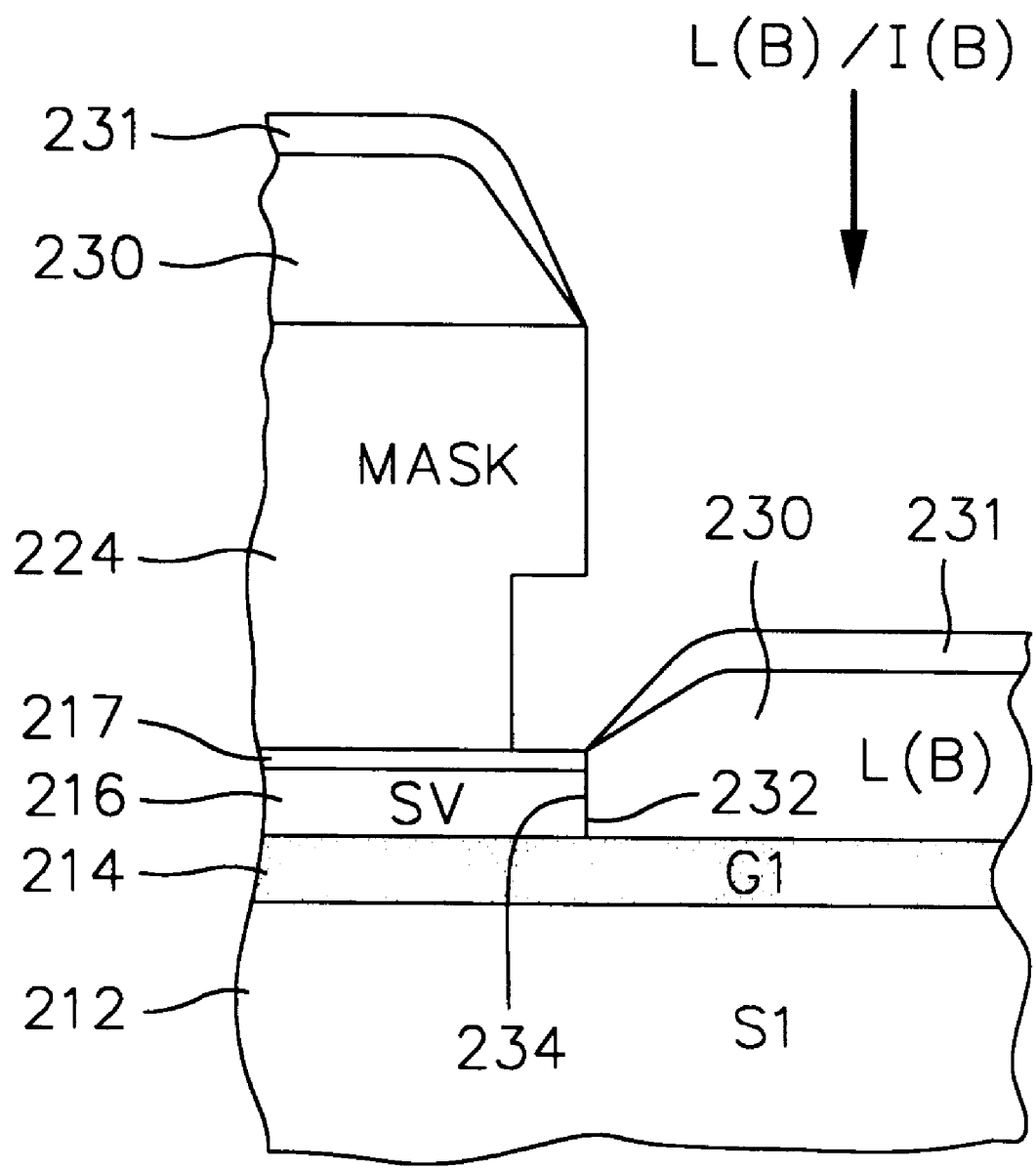
FIG. 16 is a cross-sectional view taken along plane 16—16 of FIG. 15.
Figure 17:
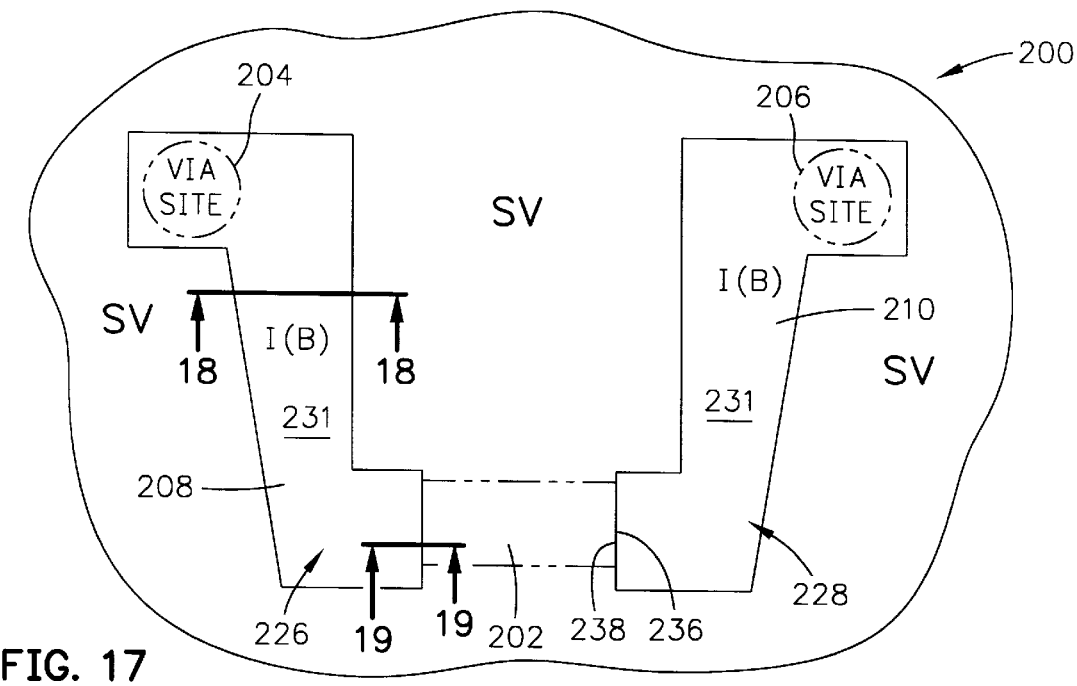
FIG. 17 is a cross-sectional view taken along plane 17—17 of FIG. 15.

In FIG. 12 a liftoff mask 224 is employed for covering the entire wafer portion except portions 226 and 228 within the first and second lead layer sites. As shown in FIGS. 13 and 14, the MR material layer 216 within the front lead layer sites 226 and 228 is milled away and hard bias and first lead layer films (shown as one film 230) are deposited on the first gap layer 214. It should be noted that the film 230 is formed as a full film deposition in which a portion of the film 230 is deposited on top of the mask 224. As stated hereinabove, the mask 224 is a bilayer photoresist mask (shown as one layer) with the bottom layer recessed from the top layer so that a dissolvent can dissolve the bottom. This allows the mask 224 to be removed from the wafer along with the film 230, which is done in a subsequent step. It should be noted in FIGS. 12 and 14 that the MR sensor material 216 at the MR sensor site 202 has been formed with a side edge 232 which directly abuts an end 234 of the film 230 at the first lead layer site to form a contiguous junction therebetween. An opposite side edge 236 of the MR sensor also forms a contiguous junction with an end 238 of the film 230 at the second lead layer site 228. In FIGS. 15, 16 and 17, the mask 224 in FIG. 12 has been removed and a second mask 240 has been formed covering only the MR sensor site 202 and slightly smaller portions of 226 and 228 of the first and second lead layer sites. As shown in FIGS. 16 and 17, the remainder of the MR material 216 is ion milled away so as to define the height of the MR sensor, which is shown at 242.

Figure 18:
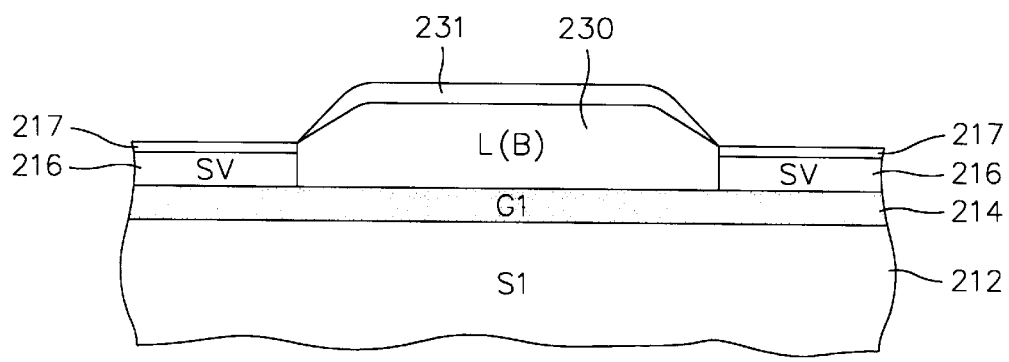
FIG. 18 is a plan view of a mask employed in a previous process for depositing a second lead layer film of each lead layer.
Figure 19:
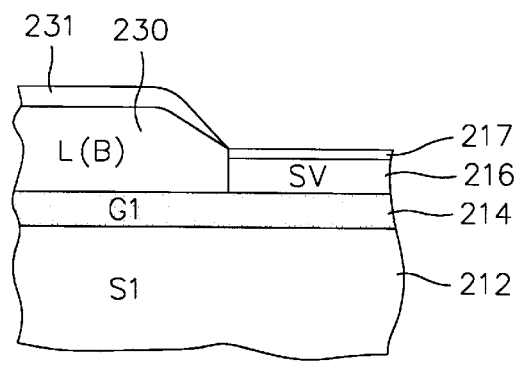
FIG. 19 is a cross sectional view taken along plane 19—19 of FIG. 18.
Figure 20:
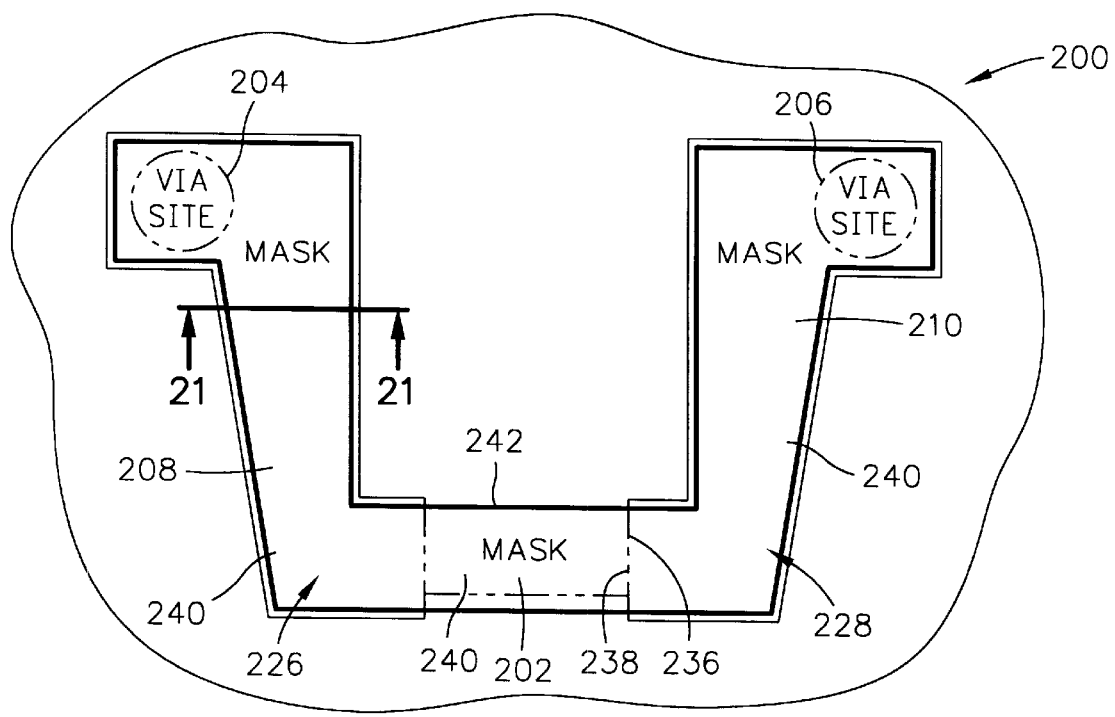
FIG. 20 is a view taken along plane 20—20 of FIG. 18.
Figure 21:
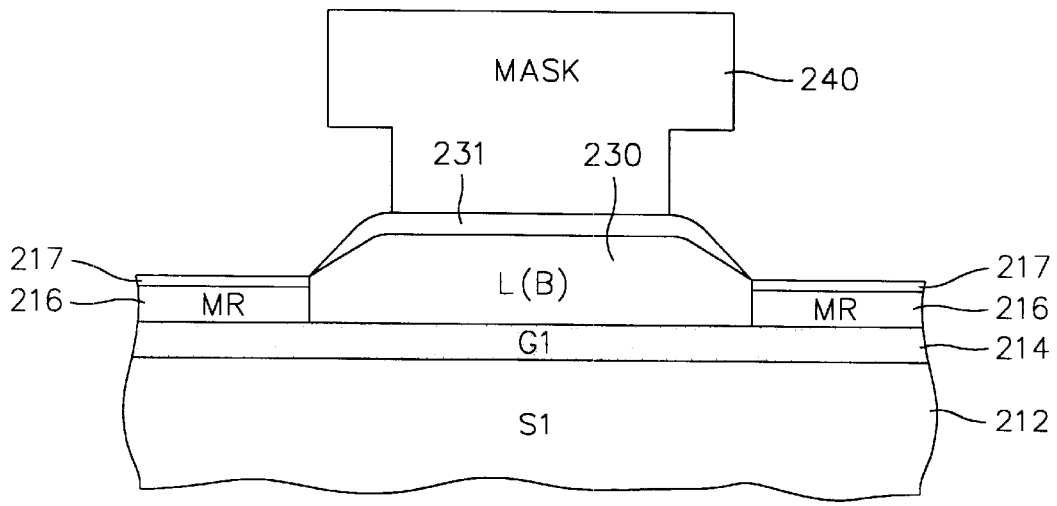
FIG. 21 is a plan view of the MR read head made by the previous process.
Figure 24:
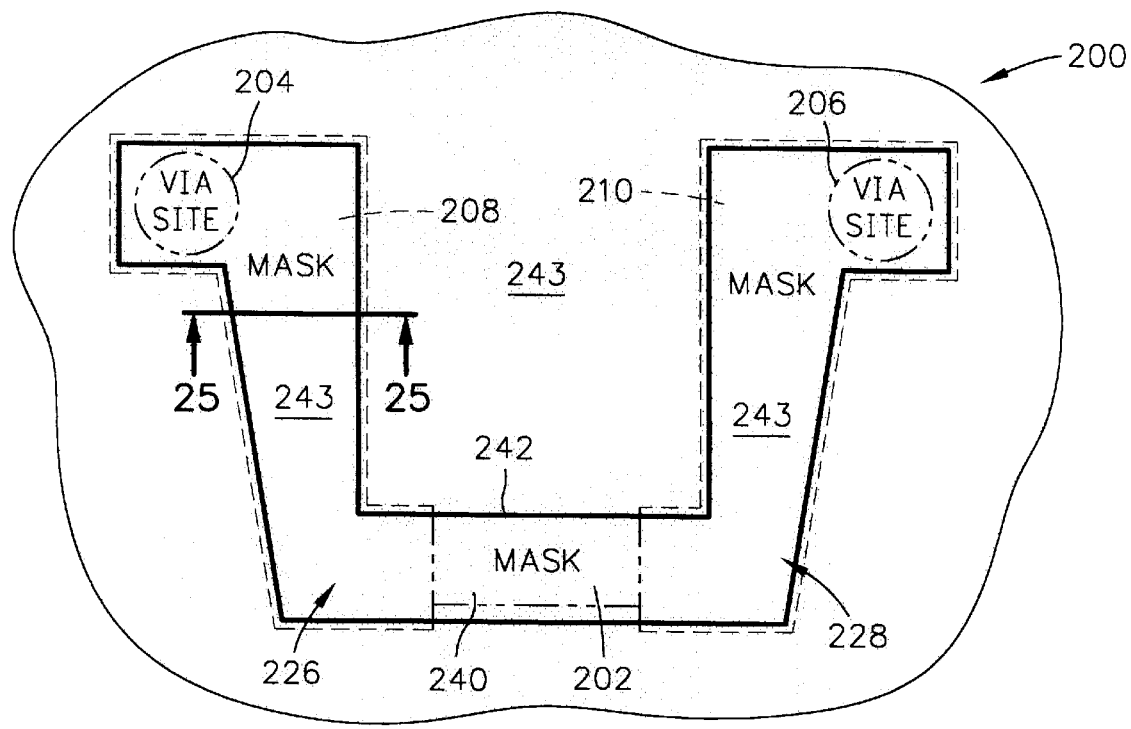
FIG. 24 is a cross-sectional view taken along plane 24—24 of FIG. 21.

In FIGS. 18, 19 and 20, the second mask 240 of FIG. 15 has been removed and a third mask 244 has been formed over the entire wafer portion 200, except rear portions 246 and 248 of the first and second lead layer sites. A second lead layer film 250 is deposited in the openings 246 and 248 so as to overlap and make connection with the underlying first lead layer films so that the lead layer films extend to the via sites 204 and 206. In FIG. 24, a second insulation layer 256 is formed in the rear portion of the head outside of the MR sensor frame, a front boundary thereof being shown at 258 in FIG. 21. A fourth mask (not shown) is employed for forming the second insulation layer 256. After removing the fourth mask a full film of a second insulative gap layer (G2) 260 is formed, as shown in FIGS. 21–24.

Figure 22:
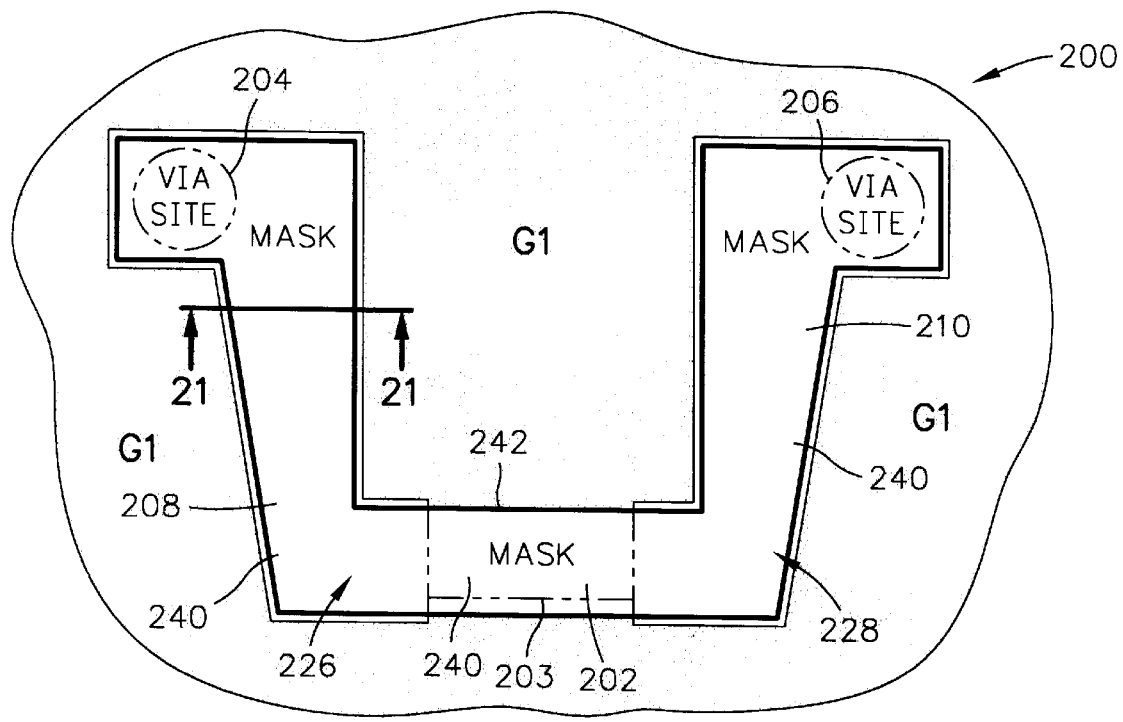
FIG. 22 is a cross-sectional view taken along plane 22—22 of FIG. 21.
Figure 23:
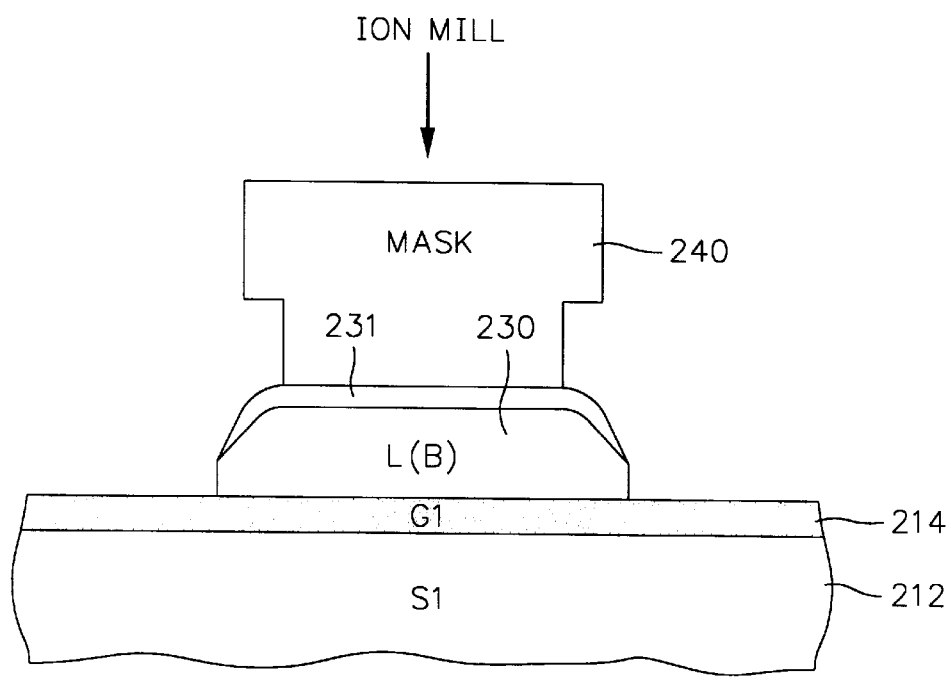
FIG. 23 is a cross-sectional view taken along plane 23—23 of FIG. 21.

As can be seen from FIG. 22, the film 230 is only protected by the first and second gap layers forward of the edge 258 of the second insulation layer 256. This leaves the front portion of the film 230 of the first and second lead layers at risk to shorting through pinholes in the first and second gap layers 214 and 260 to the first and second shield layers. Further, the first and second insulation layers 218 and 256 extend between the first and second lead layer sites 208 and 210 where there is no requirement for such insulation, thereby reducing heat dissipation from the MR sensor. It should further be noted that five separate masking steps are required to form the MR sensor 216, the first and second lead layer films 230 and 250 and the first and second insulation layers 218 and 256. Each masking step requires the wafer to be removed from the deposition chamber, thereby breaking vacuum and allowing the metallic layers 230 and 250 already deposited to become oxidized. This reduces adherence between the metal layers 230 and 250 and the insulation layers 214, 218 and 256 shown in FIGS. 22–24.

Figure 25:
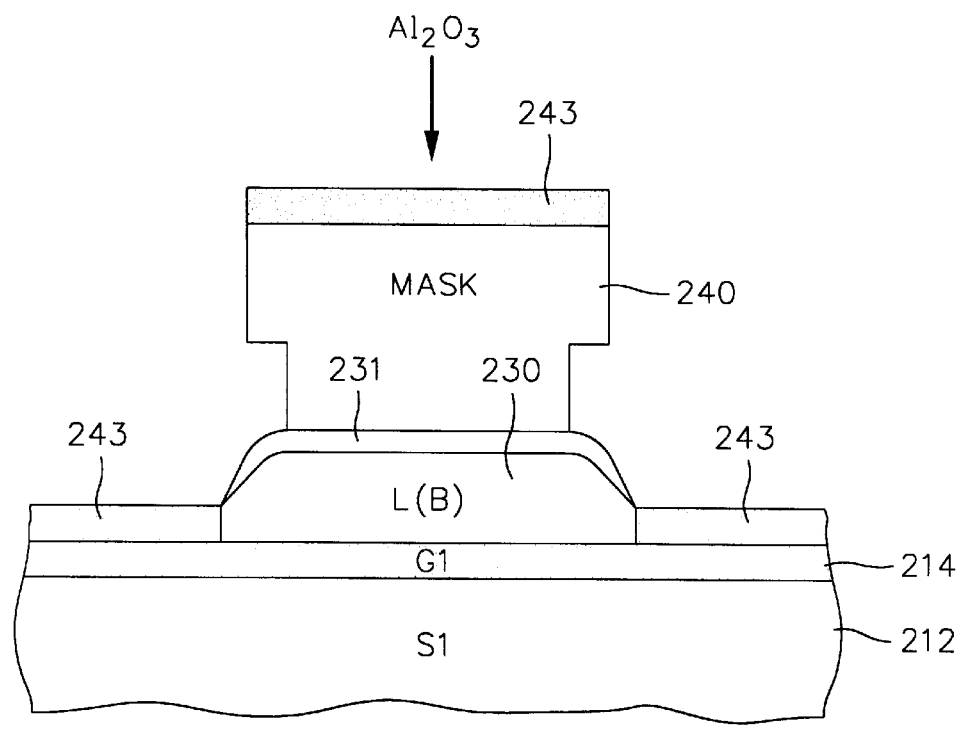
FIG. 25 is a plan view of a portion of a wafer wherein the present MR read head is to be constructed on the first gap layer.
Figure 26:
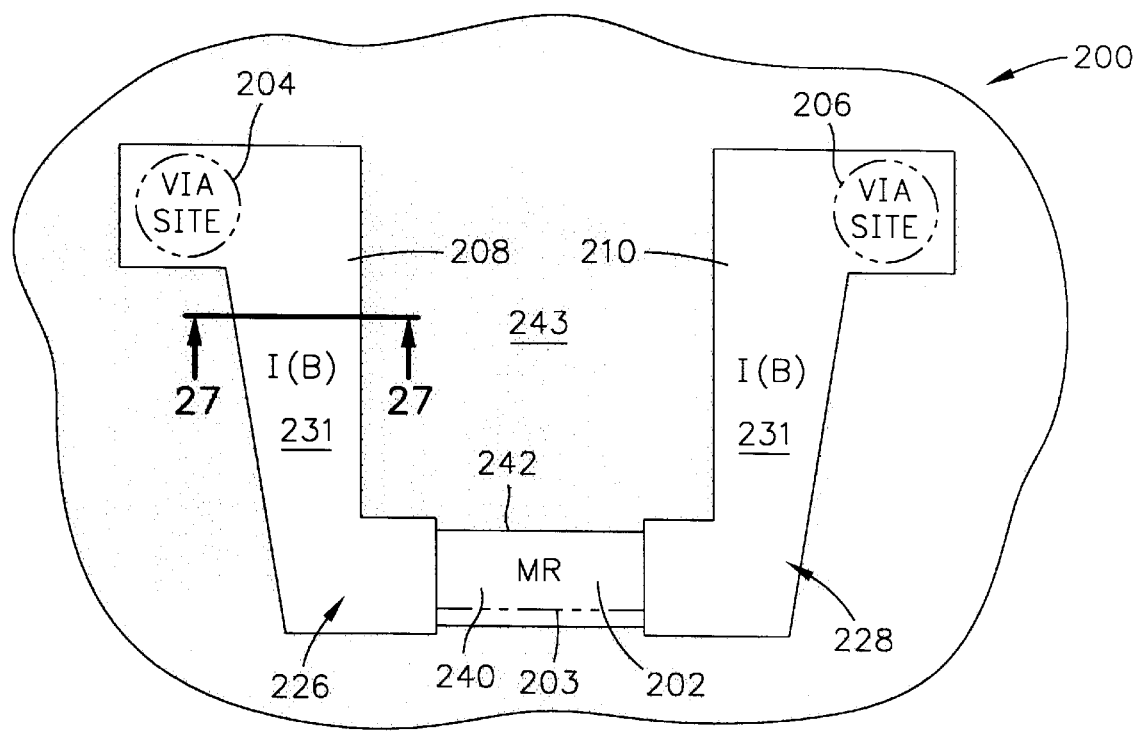
FIG. 26 is a cross-sectional view taken along plane 26—26 of FIG. 25.

FIGS. 25–58 show the present method of making the present MR read head. In FIG. 25, a portion 300 of a wafer is shown where one of the present MR read heads is to be made. Shown are an MR site 302, first and second via sites 304 and 306, and first and second lead layer sites 308 and 310. FIG. 26 shows the deposition of the first shield layer 312 and the first insulative gap layer 314, the top surface of the first insulative gap layer being shown in FIG. 25. These are full film layers which do not require a masking step.

Figure 27:
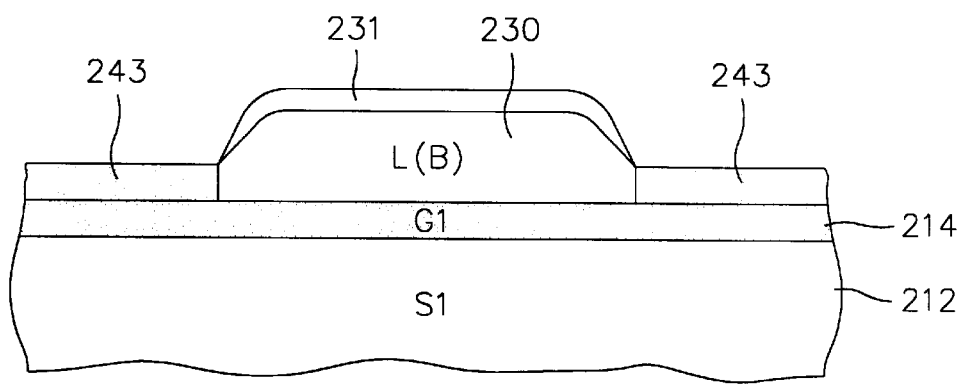
FIG. 27 is a plan view of the present process wherein a first mask is employed for constructing the first insulation layer and the first lead layer film of each lead layer.
Figure 28:
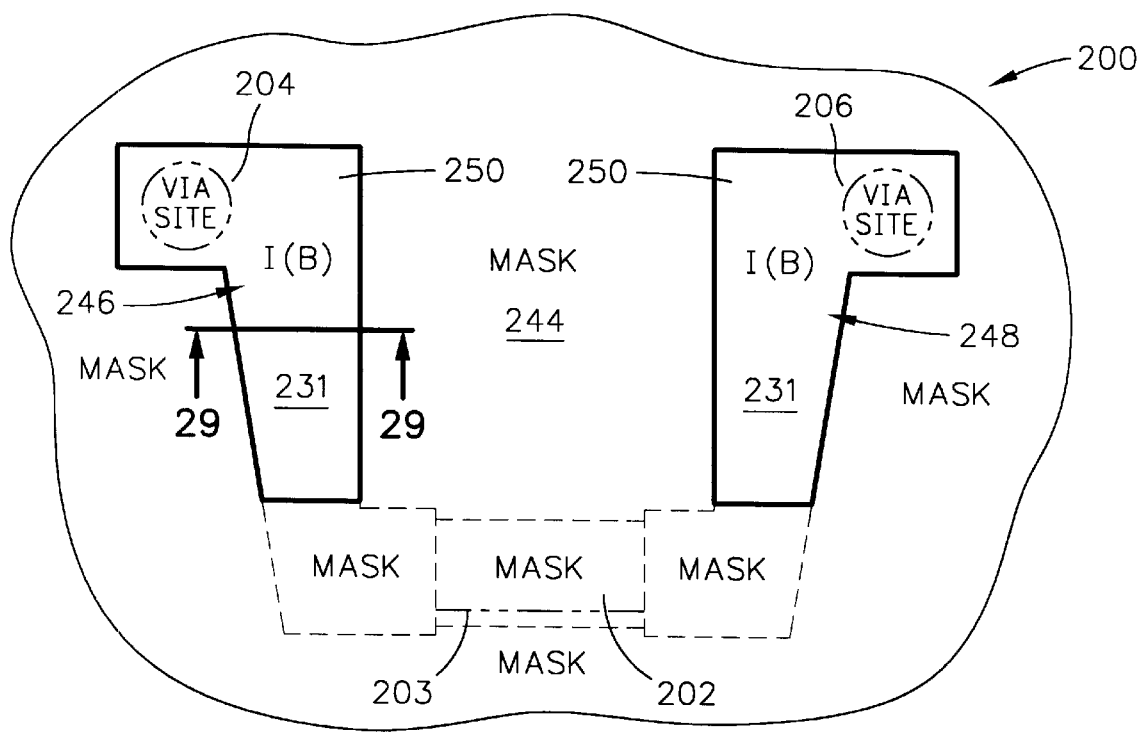
FIG. 28 is a cross-sectional view taken along plane 28—28 of FIG. 27.

In FIGS. 27 and 28, a first liftoff mask 316 is employed which covers the entire wafer portion 300 except for openings 318 and 320 which are located at a major portion of the first and second lead layer sites. The openings 318 and 320 of the mask 316 have first and second ends 322 and 324 which are spaced a slight distance, such as 1 μm to 3 μm, from first and second end edge sites 326 and 328 of the MR sensor site 302. As shown in FIG. 28, a first insulation layer 330 and a first lead layer film 332 are deposited directly on the first insulation layer through each of the openings 318 and 320.

Figure 29:
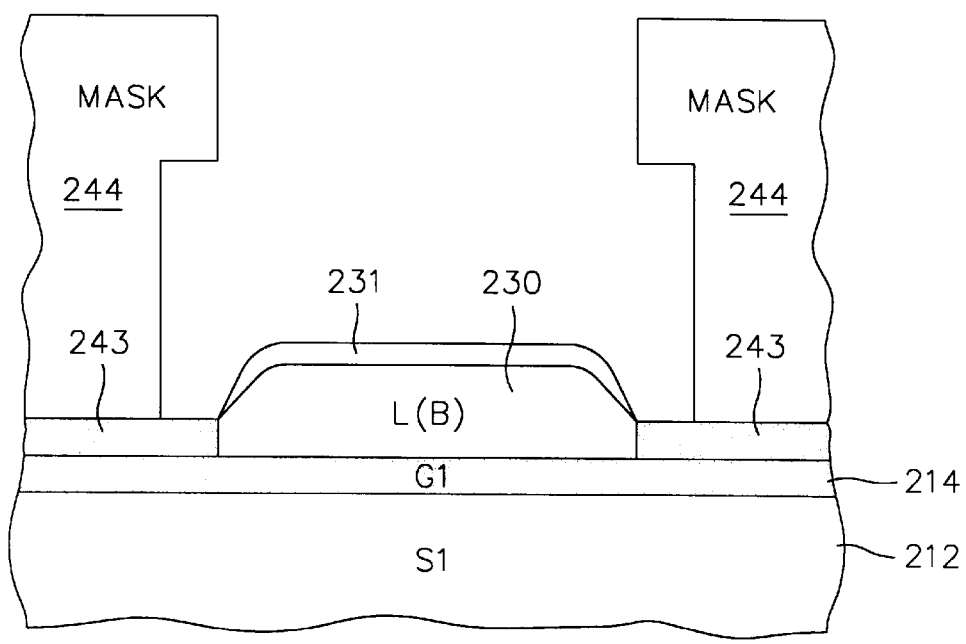
FIG. 29 is a plan view of the present process wherein the mask of FIG. 27 has been removed.
Figure 30:
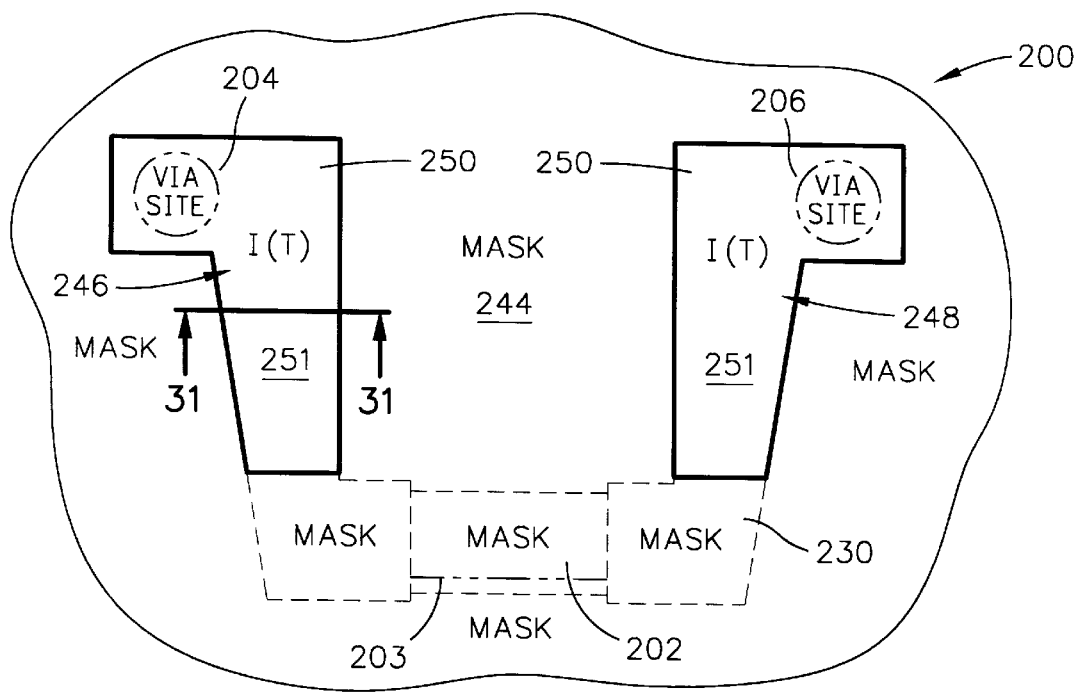
FIG. 30 is a cross-sectional view taken along plane 30—30 of FIG. 29.
Figure 31:
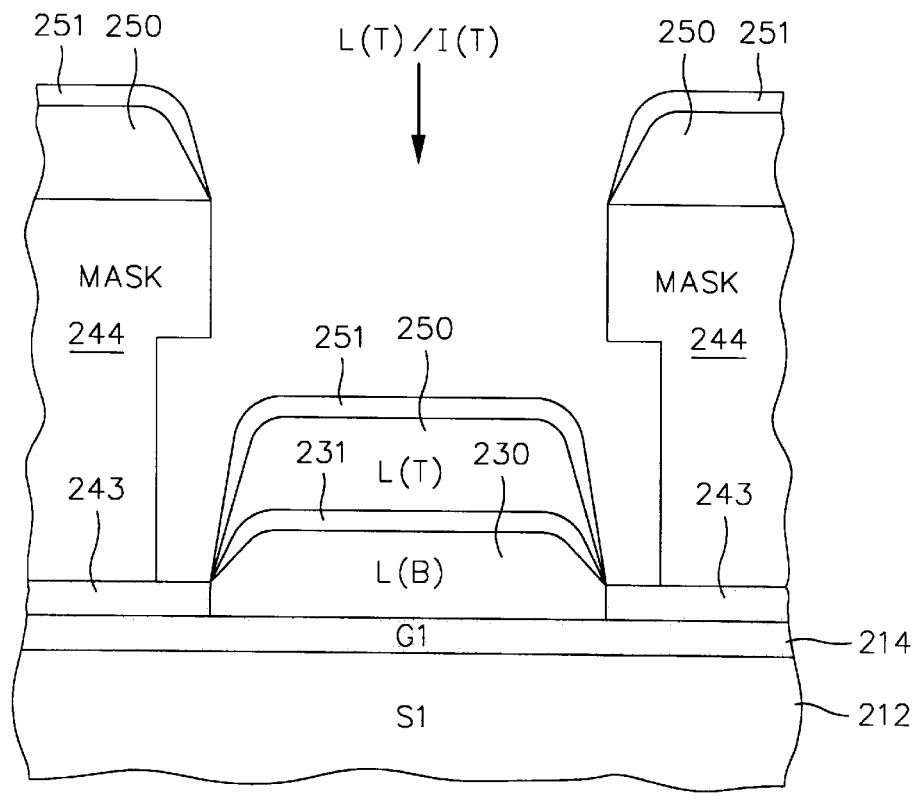
FIG. 31 is a view taken along plane 31—31 of FIG. 29.
Figure 32:
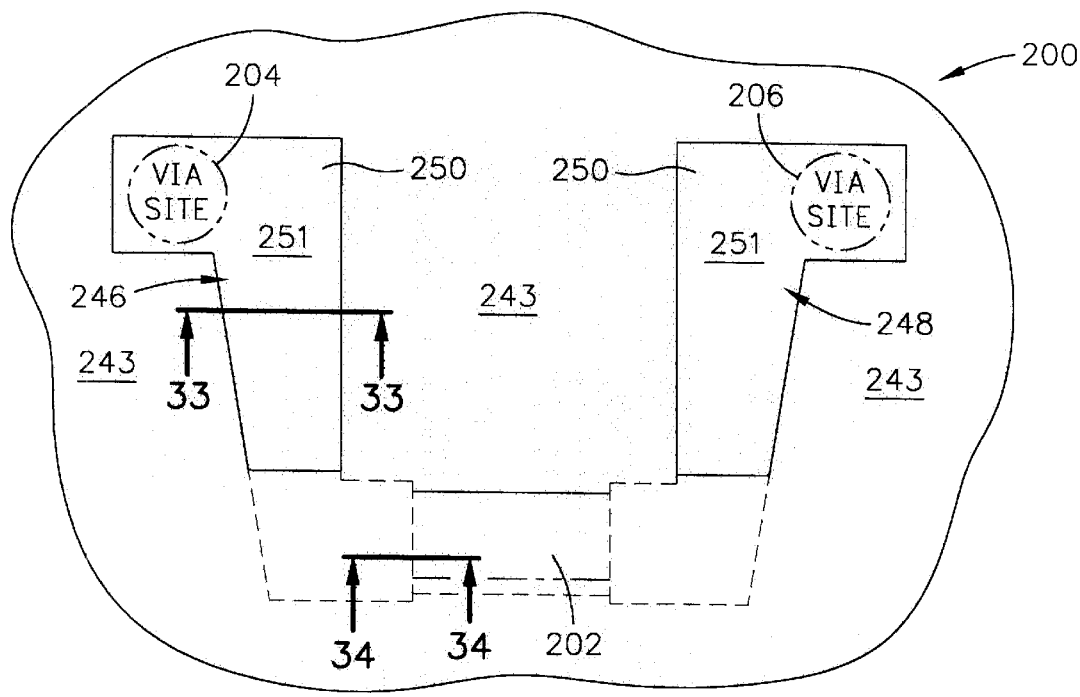
FIG. 32 is a plan view of the present process after a full film MR material layer has been deposited.
Figure 33:
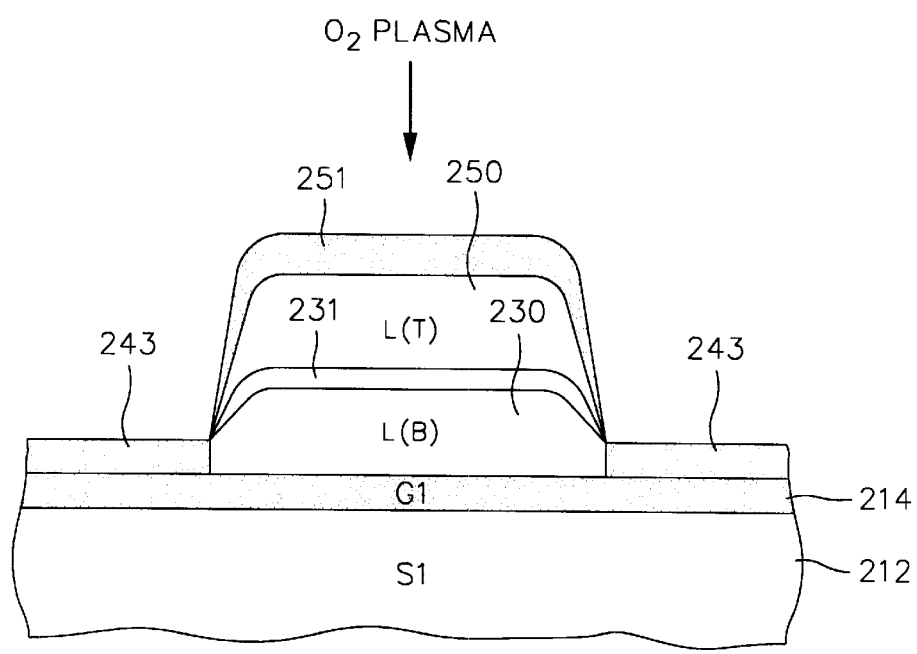
FIG. 33 is a cross-sectional view taken along plane 33—33 of FIG. 32.

In FIGS. 29–31 the mask 316 has been removed along with the layers deposited thereon, leaving the first insulation layer 330 and the first lead layer film 332 extending from ends 334 and 336 to the first and second via sites 304 and 306. It should be understood that the first lead layer film 332 of each of the first and second lead layers may optionally extend only partially to a respective via site with still another lead layer film making the connection to the terminal sites. However, the full extension of the first lead layer films all the way to the via sites 304 and 306, as shown in FIG. 29, is preferred. These lead layer films, typically Ta/Cu/Ta, are made large enough to conduct current without any heating problems. In FIGS. 32 and 33, a full film layer of MR material 338 may be deposited. A masking step is not required for this deposition.

Figure 34:
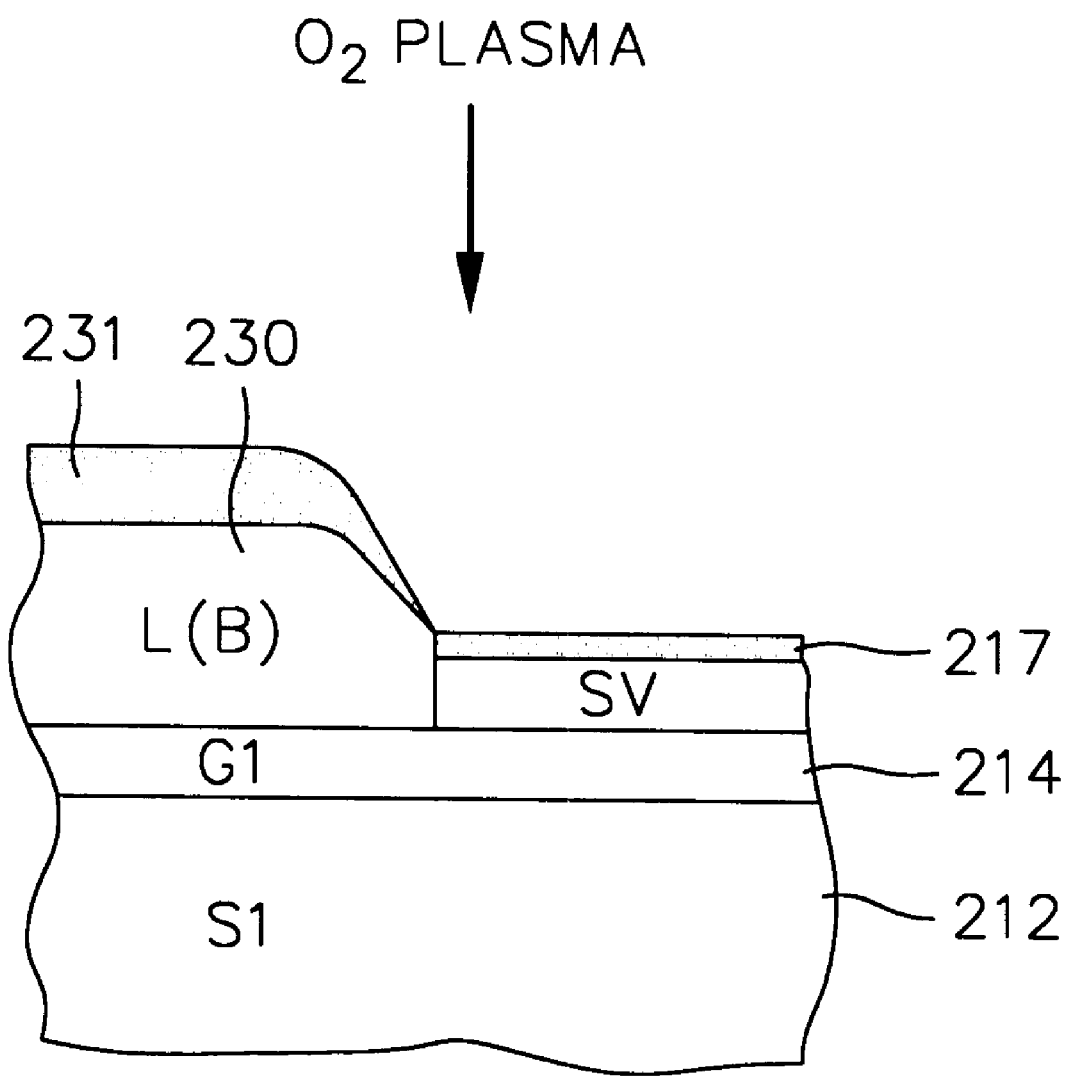
FIG. 34 is a plan view of the present process where a mask is employed for defining the track width of the MR sensor and constructing a second lead layer film and a second insulation layer at each lead layer site.
Figure 35:
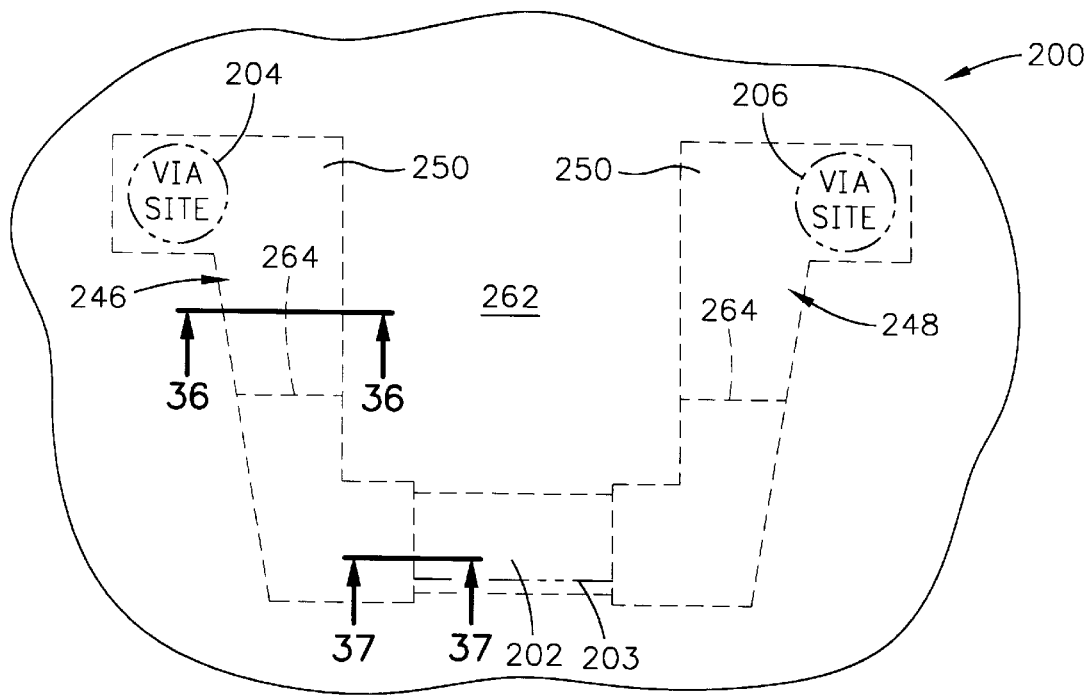
FIG. 35 is a cross-sectional view taken along plane 35—35 of FIG. 34.
Figure 36:
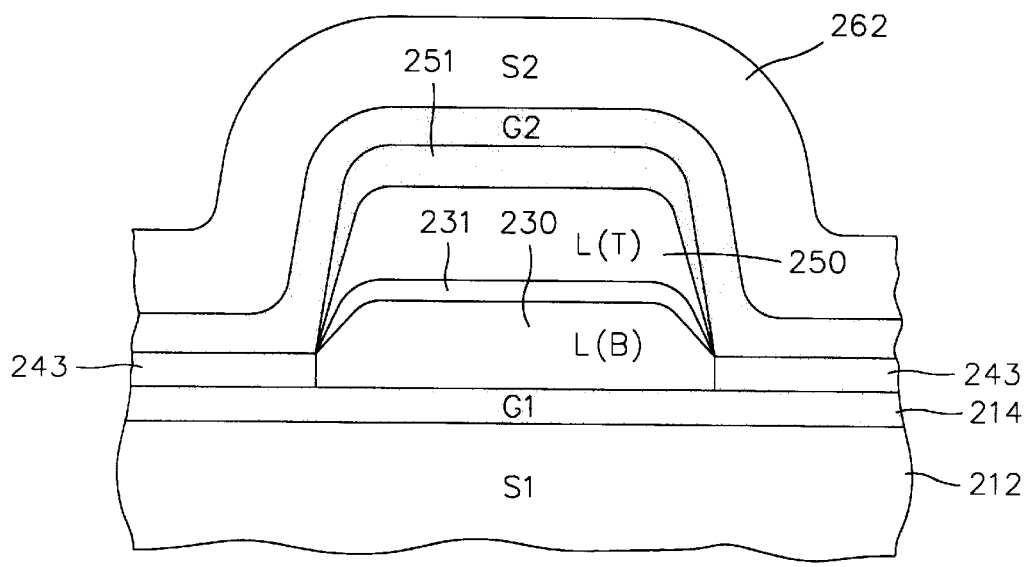
FIG. 36 is the same as FIG. 34 except MR material has been milled away to define the track width of the MR sensor.
Figure 37:
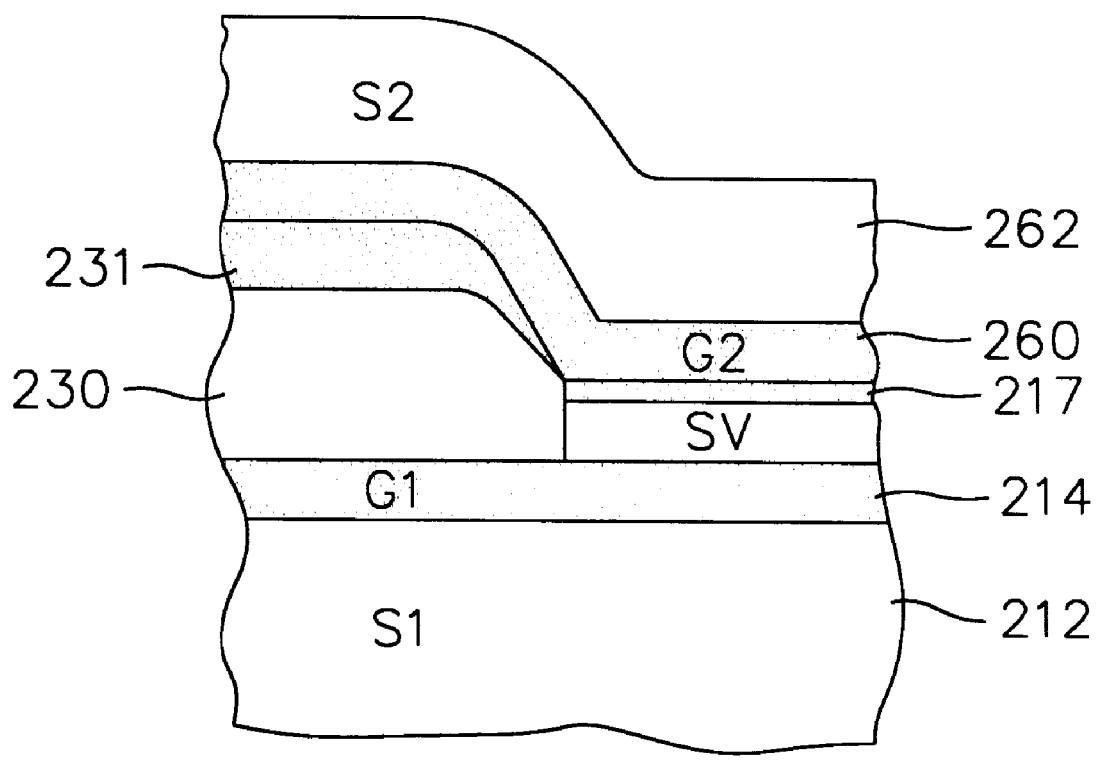
FIG. 37 is a cross-sectional view taken along plane 37—37 of FIG. 36.

In FIGS. 34 and 35, a second liftoff mask 339 is employed which covers the entire wafer portion 300, except for openings 340 and 342 at the front of the first and second lead layer sites which expose MR material 338. As shown in FIG. 34, the openings 340 and 342 in the second mask are slightly inboard of the outer boundary of the first and second lead layer sites 308 and 310, except for ends 344 and 346 which are aligned with the first and second side edge sites 326 and 328 of the MR sensor. As shown in FIGS. 36 and 37, ion milling is then used for removing the MR material exposed by the openings 340 and 342, removing the MR material as shown in FIG. 37 and forming the MR sensor with first and second side edges 348 and 350. As shown in FIG. 37, the MR material remains at all locations where the mask covers the wafer.

Figure 38:
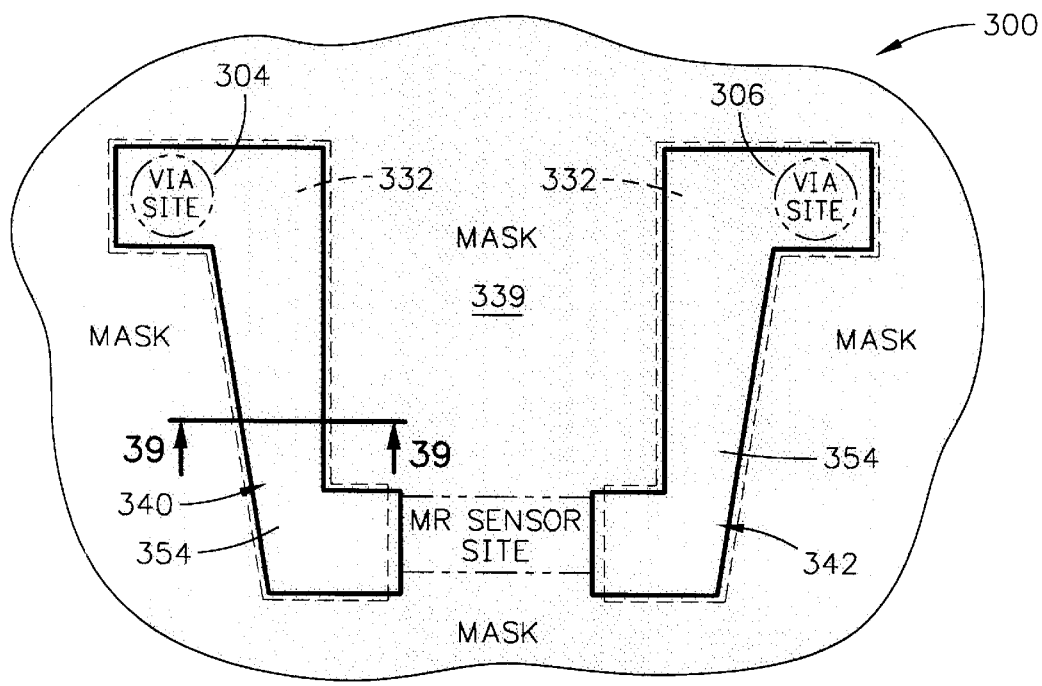
FIG. 38 is the same as FIG. 36 except the second lead layer film and the second insulation layer has been deposited at each lead layer site.
Figure 39:
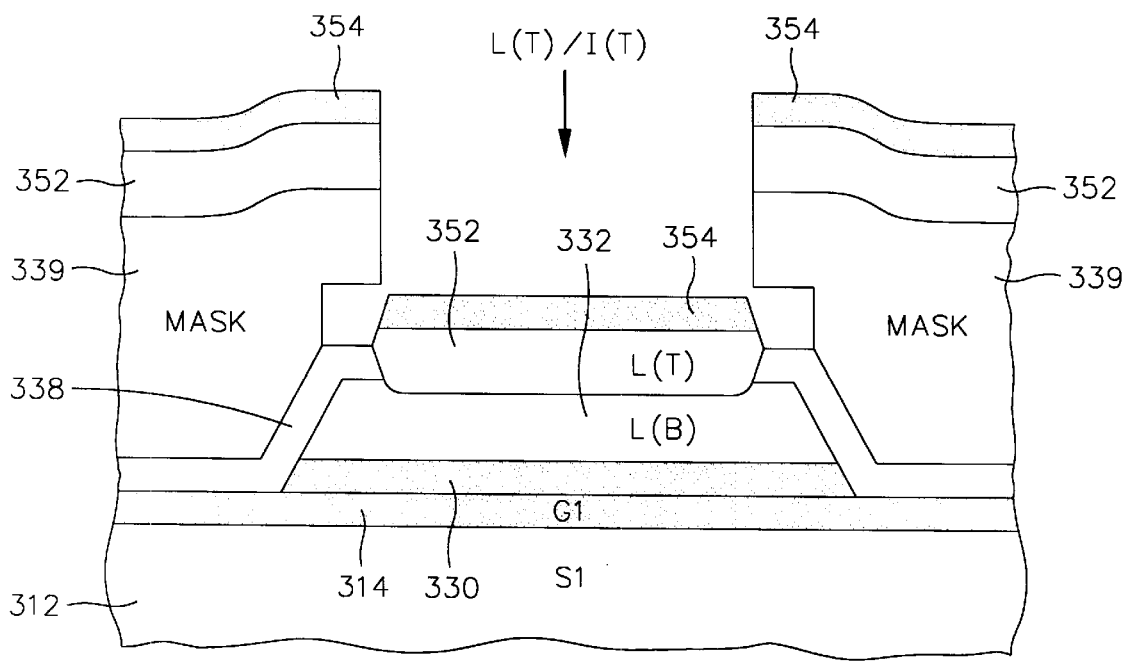
FIG. 39 is a cross-sectional view taken along plane 39—39 of FIG. 38.
Figure 40:
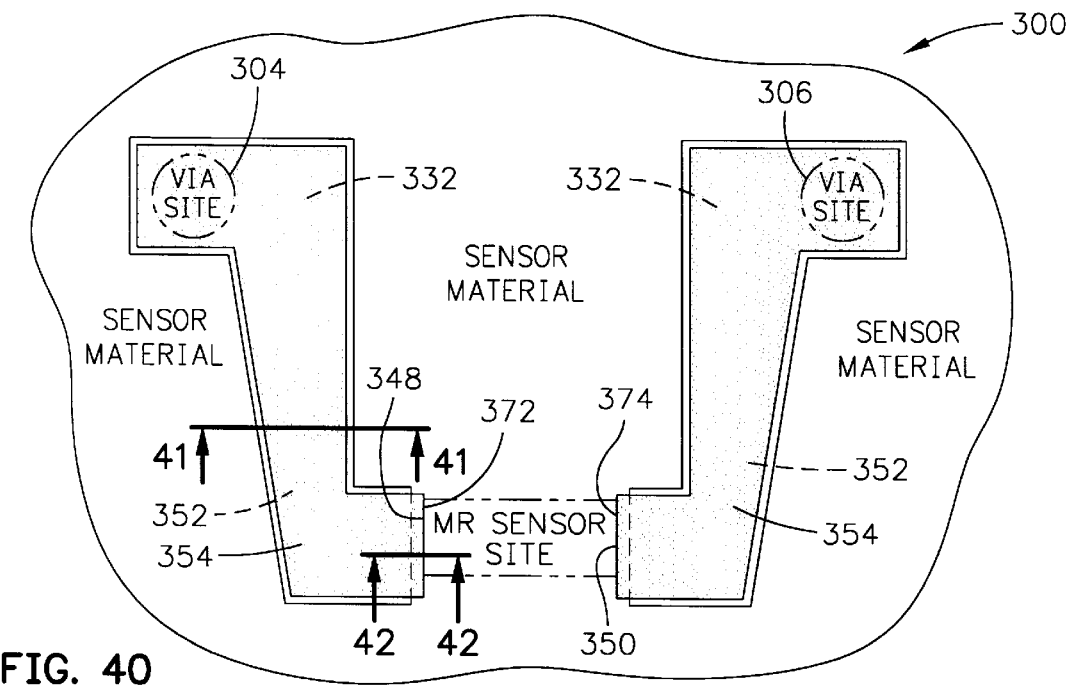
FIG. 40 is the same as FIG. 38 except the second mask layer has been removed.
Figure 41:
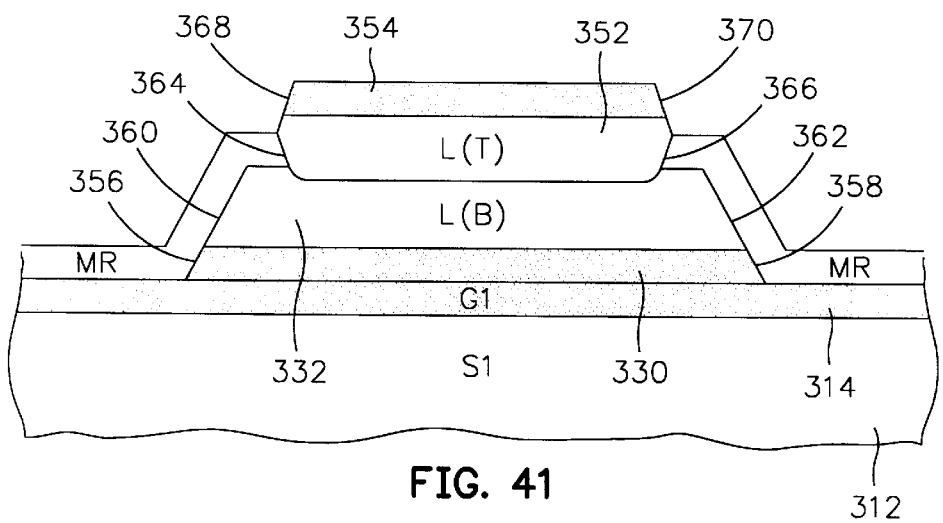
FIG. 41 is a cross-sectional view taken along plane 41—41 of FIG. 40.
Figure 42:
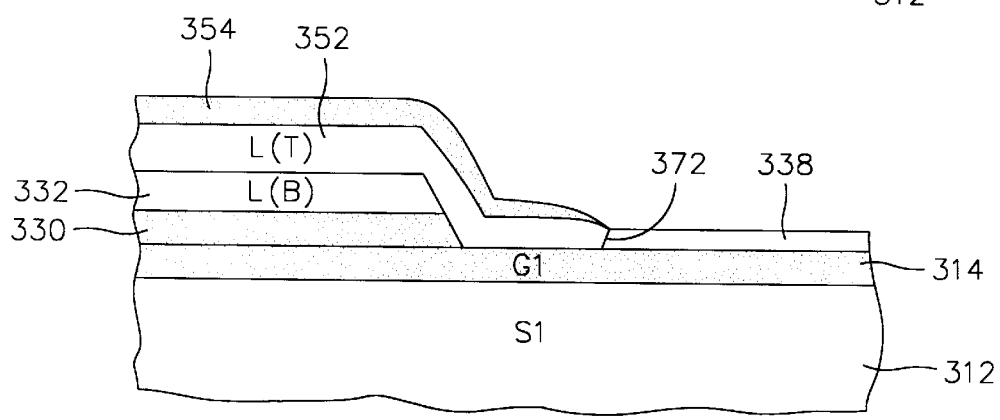
FIG. 42 is a cross-sectional view taken along plane 42—42 of FIG. 40.

In FIG. 39, a second lead layer film 352 and a second insulation layer 354 are deposited through each of the mask openings 340 and 342, the top surface of the second insulation layer being shown in FIG. 38. In FIGS. 40–42 the second mask 339 has been removed. FIG. 41 shows the first insulation layer 330 with first and second side edges 356 and 358, the first lead layer film 332 with first and second side edges 360 and 362, the second lead layer film 352 with first and second side edges 364 and 366, and the second insulation layer 354 with first and second side edges 368 and 370. It should be noted that the first and second side edges 364 and 366 of the second lead layer film and the first and second side edges 368 and 370 of the second insulation layer are slightly inboard of the first and second side edges 356 and 358 of the first insulation layer and the first and second side edges 360 and 362 of the first lead layer film. This ensures that the second lead layer film 352 is fully protected by the first insulation layer 330 and ensures full removal of unwanted MR material in a subsequent step. FIGS. 40 and 42 show hard bias and second lead layer films 352 as having ends 372 and 374 that abut and make direct electrical contact with side edges 348 and 350 of the MR sensor. These connections are known in the art as contiguous junctions. It should be noted from FIG. 42 that the hard bias and second lead layer film 352 drops down over the ends of the first lead layer film 332 and the first insulation layer 330 to make the contiguous junction.

Figure 43:
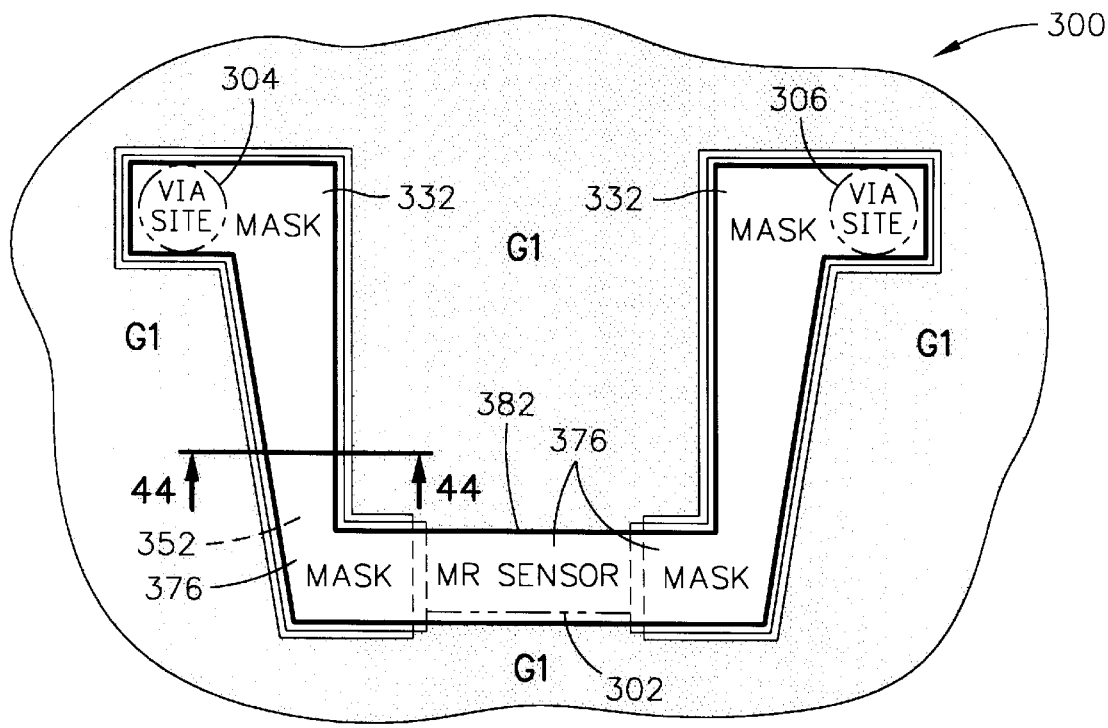
FIG. 43 is a plan view of the present process wherein a third mask layer is employed for removing MR material by ion milling to define the height of the MR sensor and deposit a third film of a third insulation layer everywhere except at the location of the MR sensor and the first and second lead layer films.
Figure 44:
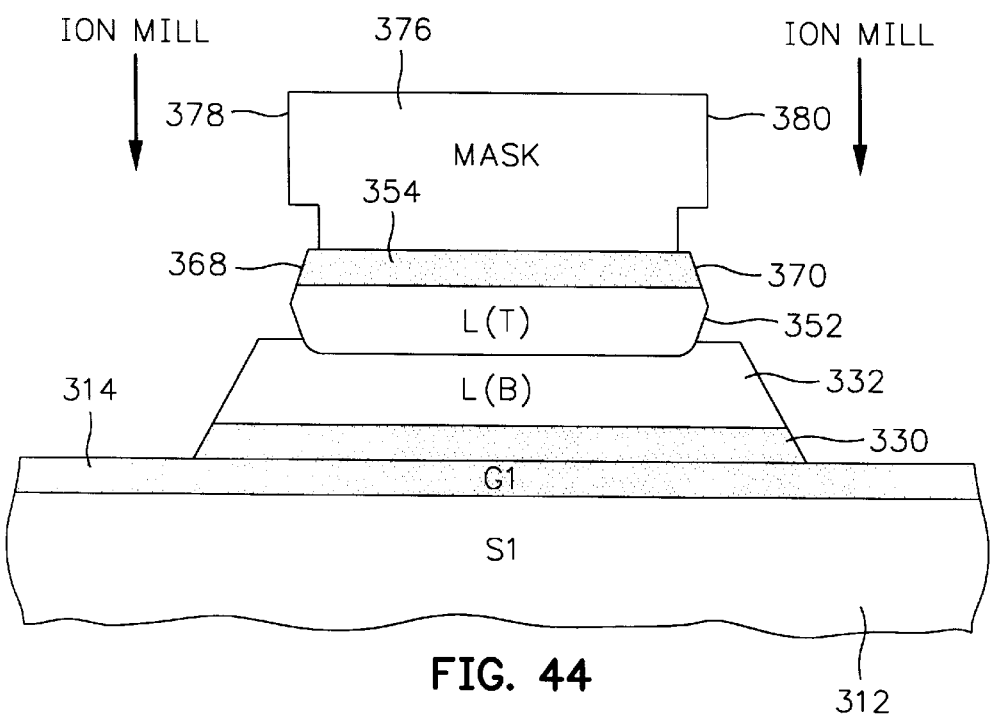
FIG. 44 is a cross-sectional view taken along plane 44—44 of FIG. 43.

In FIGS. 43 and 44, the second mask 339 has been removed and a third mask 376 formed which covers the MR site 302 and a majority of the second insulation layer 354. As shown in FIGS. 43 and 44, the side edges 378 and 380 of the third mask are slightly inboard of the side edges 368 and 370 of the second insulation layer. It should be noted from FIG. 43 that a rear edge opening 382 of the third mask 376 is exactly aligned for defining the stripe height of the MR sensor. As shown in FIG. 44, all of the MR material remaining is removed by ion milling so that the MR sensor is formed with a height at 382. At this stage, the only feature of the MR sensor yet to be formed is its exposed edge at the ABS which is fabricated by lapping after the wafer is completed and diced into rows.

Figure 45:
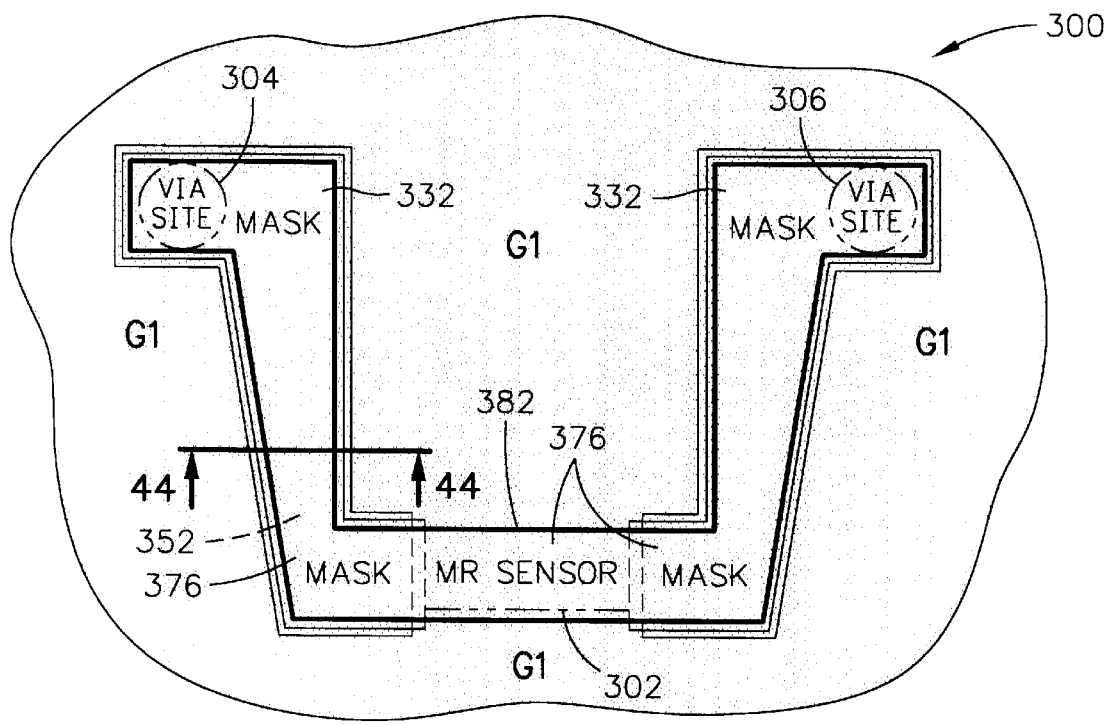
FIG. 45 is the same as FIG. 43 except a third insulation layer has been deposited.
Figure 46:
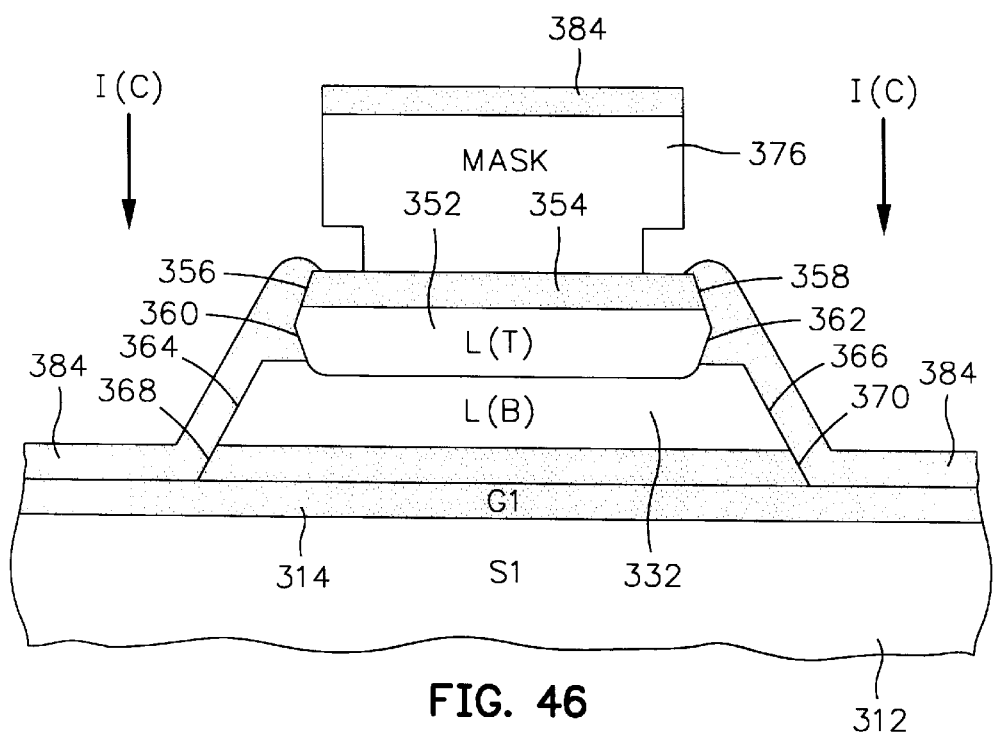
FIG. 46 is a cross-sectional view taken along plane 46—46 of FIG. 45.
Figure 47:
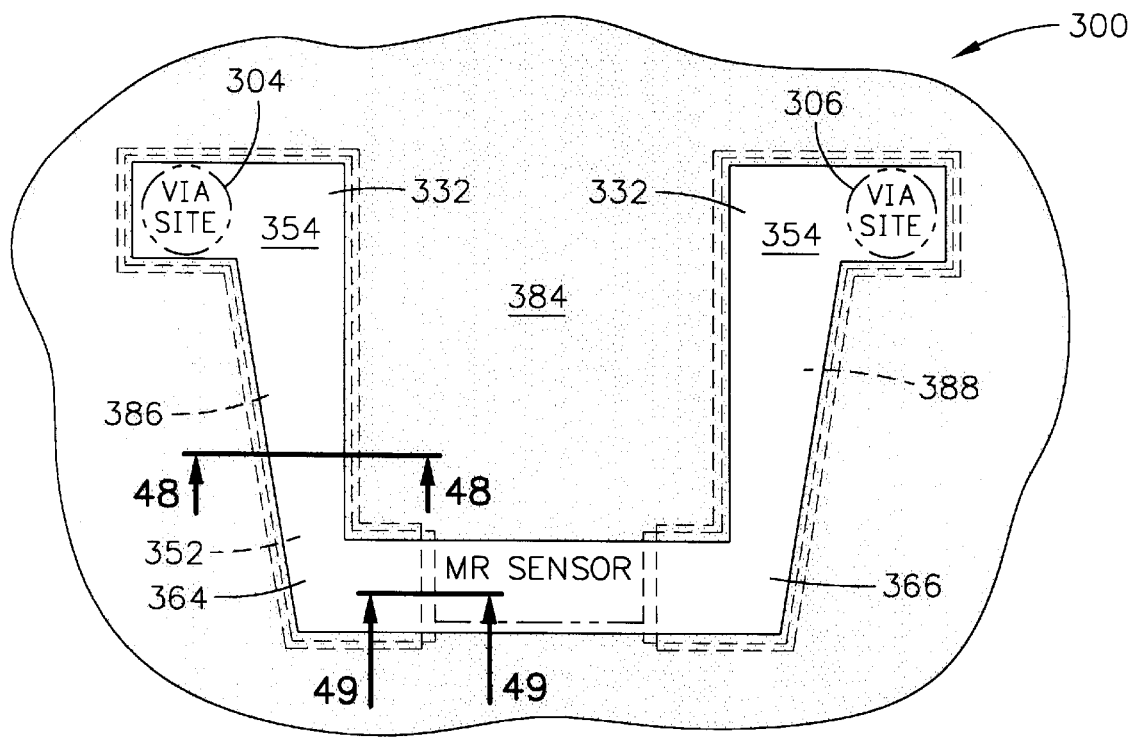
FIG. 47 is the same as FIG. 45 except the third mask layer has been removed.
Figure 48:
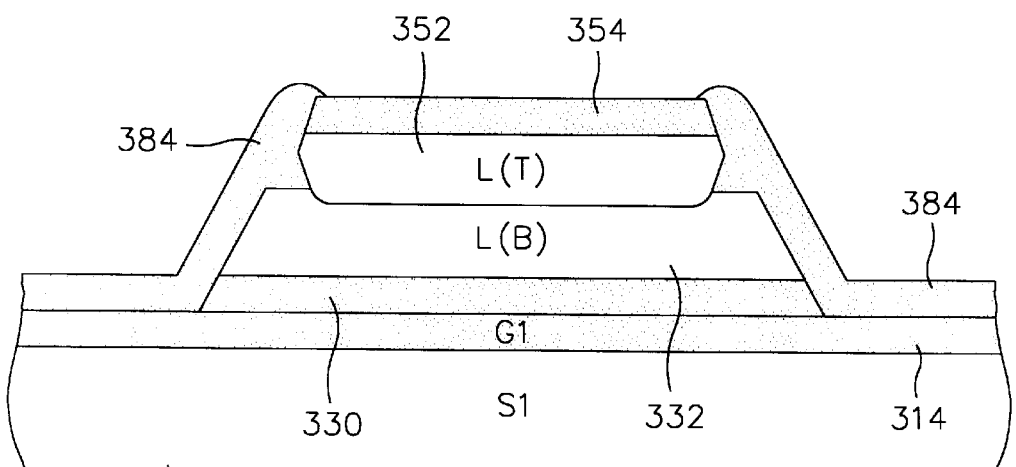
FIG. 48 is a cross-sectional view taken along plane 48—48 of FIG. 47.
Figure 49:
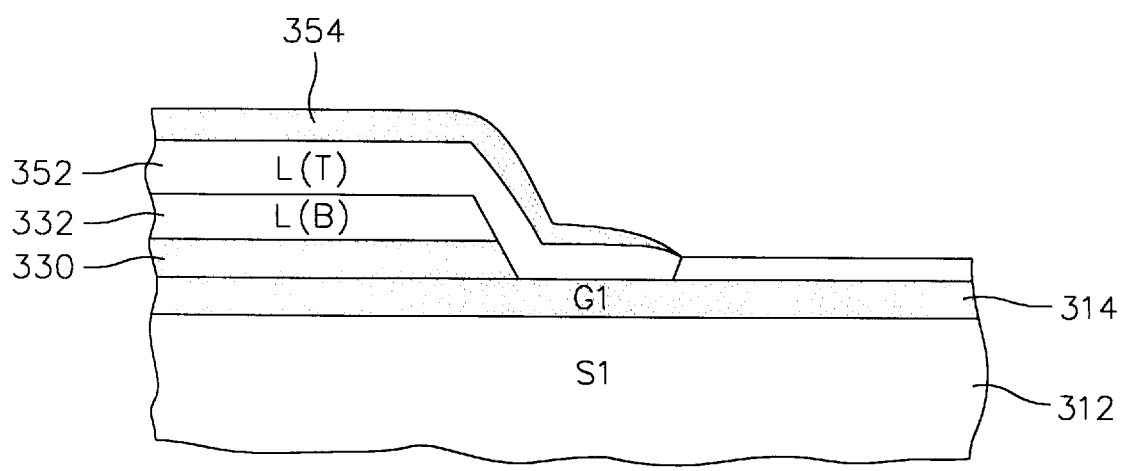
FIG. 49 is a cross-sectional view taken along plane 49—49 of FIG. 47.

In FIGS. 45 and 46, a third insulation layer 384 is formed which covers the first and second edges 356 and 358 of the first insulation layer, the first and second edges 360 and 362 of the first lead layer film, the first and second edges 364 and 366 of the second lead layer film, and the first and second edges 368 and 370 of the second insulation layer. In FIGS. 47 and 48, the third mask layer 376 is removed leaving the third insulation layer 384 covering all areas except where the third mask 376 was located. As shown in FIG. 47, the first lead layer film has portions 386 and 388 that extend from overlapping 364 and 366 overlapped by the second lead layer film to the first and second terminal sites 304 and 306.

Figure 50:
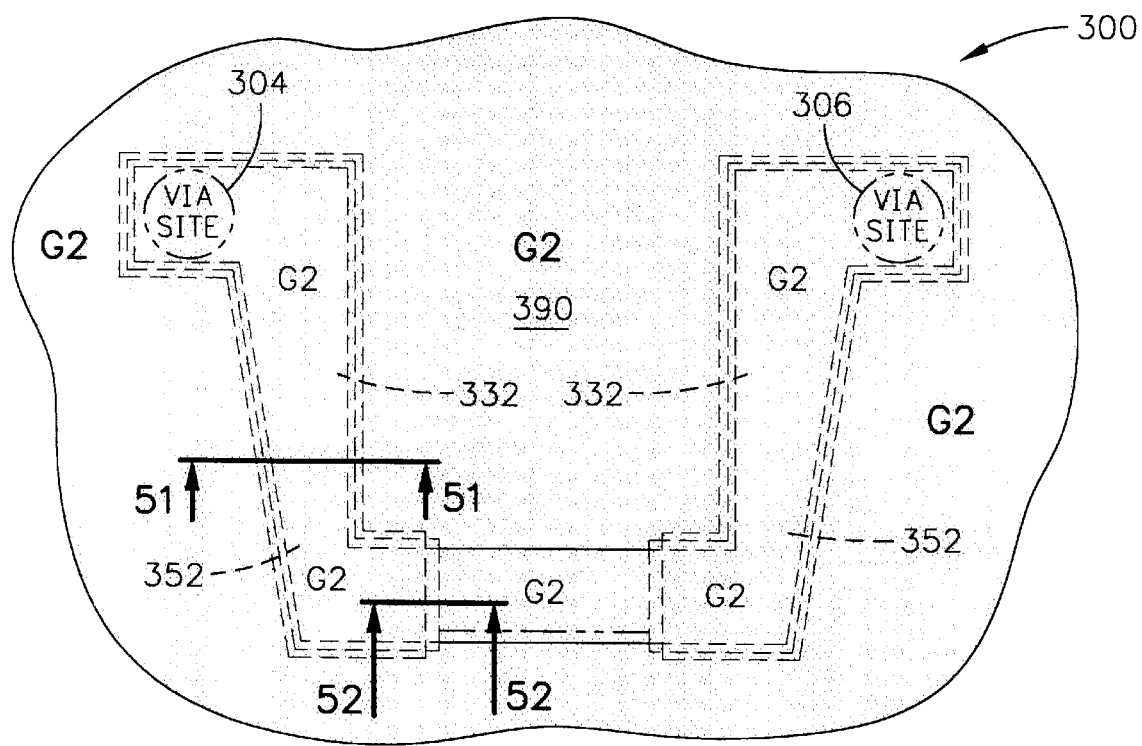
FIG. 50 is a plan view of the present process wherein the second insulative gap layer has been deposited.
Figure 51:
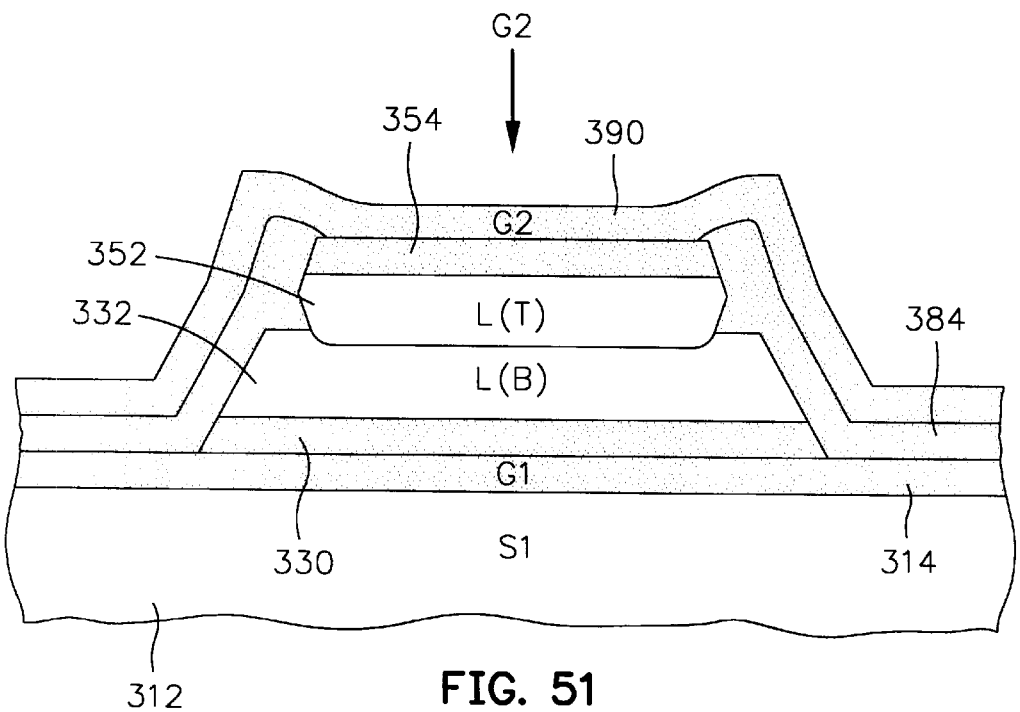
FIG. 51 is a cross-sectional view taken along plane 51—51 of FIG. 50.
Figure 52:
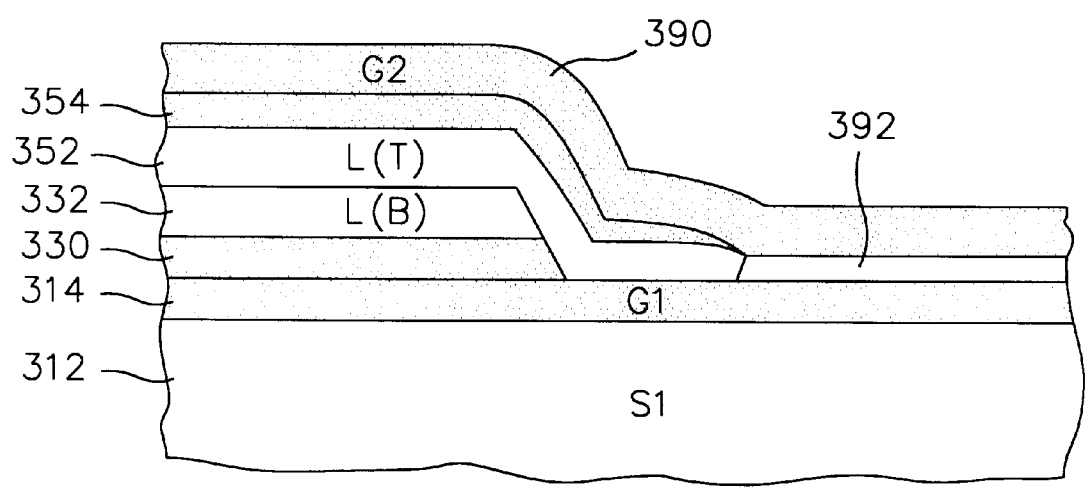
FIG. 52 is a cross-sectional view taken along plane 52—52 of FIG. 50.
Figure 53:
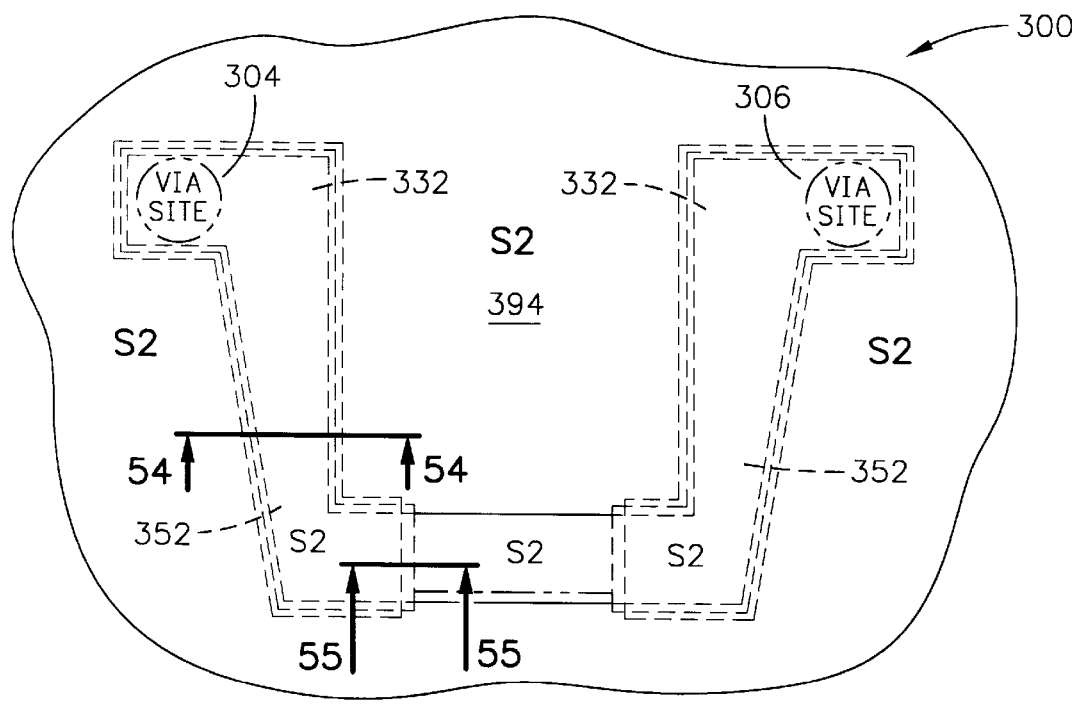
FIG. 53 is plan view of the present process wherein the second shield layer has been deposited.
Figure 54:
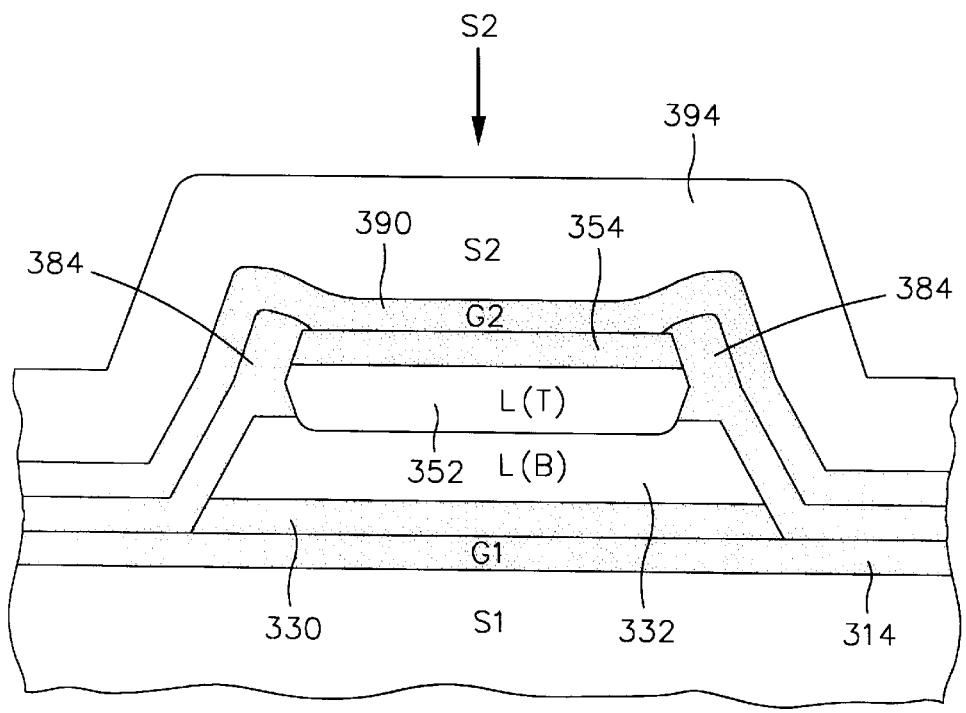
FIG. 54 is a cross-sectional view taken along plane 54—54 of FIG. 53.
Figure 55:
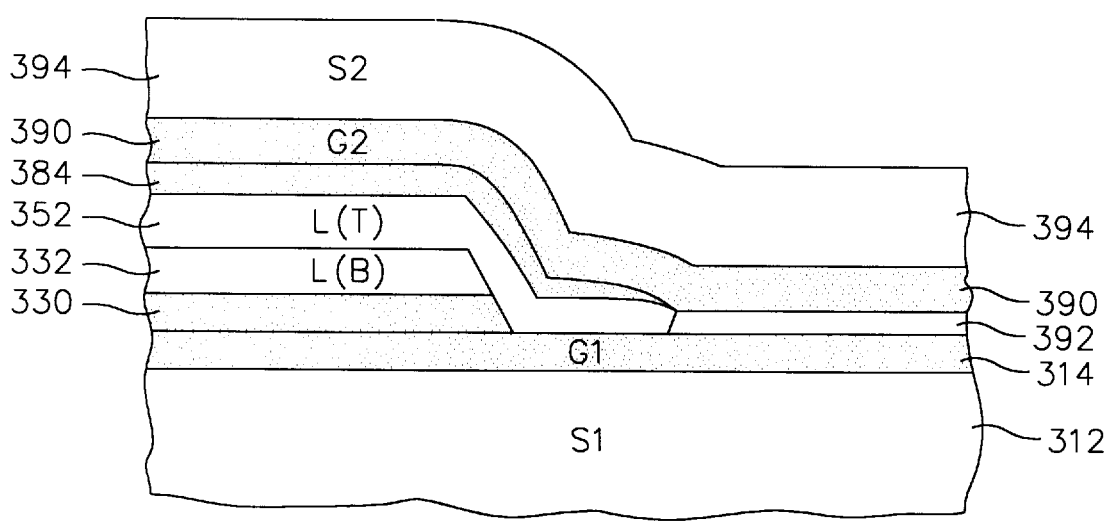
FIG. 55 is a cross-sectional view taken along plane 55—55 of FIG. 53.

In FIGS. 50–52, the third mask 376 has been removed and a full film of a second insulative gap layer 390 has been deposited. As can be seen from FIGS. 50 and 512, the overlapping portions of the first and second lead layer films 332 and 352 are provided with extra insulation because of the second gap layer 390. As shown in FIG. 52, the second gap layer 390 also covers the partially completed MR sensor 392. Next, a second shield layer 394 is deposited, as shown in FIGS. 53–55. The second shield layer may be patterned at the time of its deposition so as to acquire the desired shape. Since the second shield layer is typically smaller than the first shield layer, the first shield layer can then be patterned after the second shield layer by masking the desired portion and ion milling the remainder away or, optionally, the first shield layer can be patterned at the time of its deposition (see FIGS. 25 and 26).

FIG. 54 now shows the first and second lead layer films 332 and 352 protected at their bottoms by the first gap layer 314 and the first insulation layer 330, protected at their tops by the second insulation layer 354 and the second gap layer 390, and protected at their edges by the third insulation layer 384. FIG. 55 shows that the only insulation layers between the partially completed MR sensor 392 and the first and second shield layers 312 and 394 are the first and second gap layers 314 and 390. The thickness of the MR sensor 392 and the thickness of first and second gap layers 314 and 390 define the read gap resolution of the read head.

Figure 56:
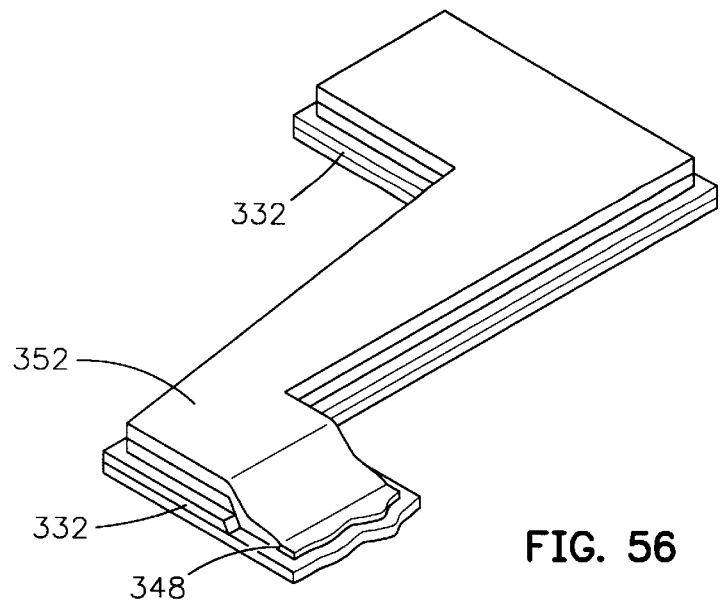
FIG. 56 is an isometric illustration of the material layers at one of the lead layer sites from the side edge of the MR sensor to one of the terminals.
Figure 57:
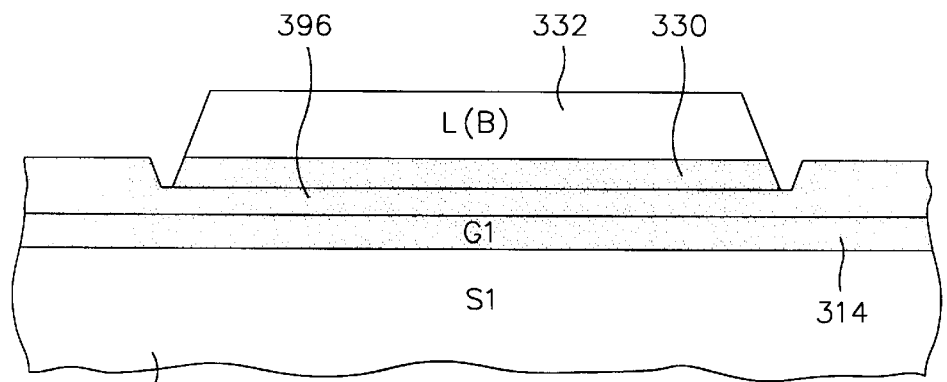
FIG. 57 is a cross-sectional view of an optional embodiment to that shown in FIG. 30.

With the present invention the first and second gap layers 314 and 390 can be made extremely thin without any risk that pinholes in these layers at the first and second lead layer sites will cause shorts to the first and second shield layers 312 and 394 because the previous steps have provided adequate insulation against such shorting. It should be noted from FIG. 55 that the bottom surfaces of the first insulation layer 330 and the bottom surface of the partially completed MR sensor 392 are substantially on the same plane since they are both deposited on the first gap layer 314. FIG. 56 is an isometric illustration of one of the lead layers showing how the second lead layer film 352 drops down over the first lead layer film 332 and the first insulation layer to make a contiguous junction with a respective side edge 348 of the MR sensor. While details of the construction have been primarily described for the first lead layer site 308 it should be understood that this description applies equally as well to construction at the second lead layer site 310.

In another embodiment of the invention, the MR sensor is a spin valve which includes an antiferromagnetic layer made of a dielectric material such as NiO. An extended portion of this antiferromagnetic layer that extends into the first and second lead layer sites is shown (out of proportion) at 396 in FIG. 57. At the MR site there are other layers on top of the antiferromagnetic layer, namely a pinned layer, a spacer layer and a free layer (not shown), which are milled away so that only the antiferromagnetic layer portion 396 remains within the lead layer sites. The slight overmilling of this layer, shown in FIG. 57, ensures that the other layers are completely removed. The ion milling can be performed by employing the first mask shown in FIGS. 27 and 28. With the first mask in place, ion milling is completed, followed by depositing the first insulation layer 330 on the antiferromagnetic layer portion 396 and depositing the first lead layer film 332 on the first insulation layer, as shown in FIG. 56. The advantage of this embodiment is that the extended antiferromagnetic layer portion 396 of the MR sensor can then serve as extra insulation between the lead layers and the first shield layer 312 to further prevent shorting.

Figure 58:
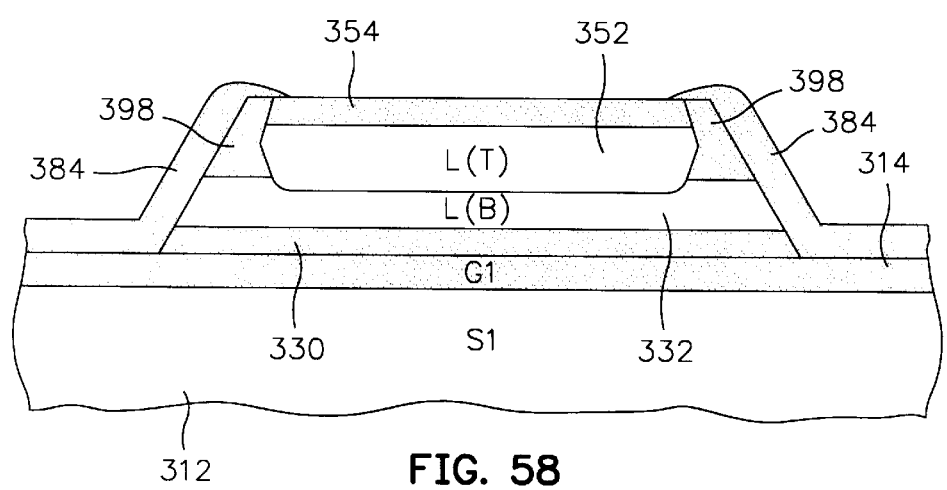
FIG. 58 is a cross-sectional view of an alternative embodiment to that shown in FIG. 41.

Another embodiment is shown in FIG. 58 which enables further buildup of insulation of the edge of the second lead layer film 352 by the use of a thin film of $SiO_2$ 398. The $SiO_2$ layer 398 is deposited serially after deposition of the layer 330 and first lead layer 332 (FIG. 28). The $SiO_2$ layer 398 is preferably between 100 to 500 Å thick and is deposited by sputter deposition. In FIG. 33 the MR material 338 will now cover the first lead layer 332 with the $SiO_2$ layer 398 being located between the MR material layer 338 and the first lead 332. After the photo process to define the resist mask 339 (FIG. 335) and after the ion milling step to remove the MR layer (FIGS. 36 and 37) the $SiO_2$ layer 398 is preferentially removed by SF6, or equivalent, reactive ion milling using the resist mask 339. Once the $SiO_2$ layer 398 is partially removed the longitudinal bias and second layer films 352 are deposited (FIGS. 38 and 39). The edges 364 and 366 of the second lead abut the $SiO_2$ layer as shown in FIG. 58. Then the third photo process (FIG. 46) to define the MR back edge 382 can take place and the third insulation layer 384 will again protect the edges 364, 366, 360 and 362 of the first and second leads 332 and 352 as was the case in FIG. 46 except that now there is an extra insulation of $SiO_2$ 398 at each side of the edges 360 and 362 extending up to the top insulation layer 354.

It can now be seen from FIG. 54 that only three liftoff masks are required to form an MR sensor, first and second lead layers 332 and 352 and first, second and third insulation layers 330, 354 and 384 of an MR read head according to the invention. The first and second insulation layers 330 and 354 are confined to only the first and second lead layer sites so that a considerable amount of the insulation material is absent from the area adjacent the MR sensor, so as to permit improved heat dissipation therefrom. Because of the method employed with the first and second masks 316 and 339, the first insulation layer 330 and the first lead layer film 332 are substantially self-aligned and the second lead layer film 352 and the second insulation layer 354 are substantially self-aligned. The edges of all these layers are substantially aligned with one another with the second lead layer film 352 and the second insulation layer 354 slightly inboard from the edges of the first insulation layer 330 and the first lead layer film 332, as shown in FIG. 53. The first and second lead layers are now substantially entirely protected from the risk of shorting due to pin holes in the first and second gap layers 314 and 390 substantially all the way from the side edges 326 and 328 of the MR sensor to the via sites 304 and 306.

Clearly, other embodiments and modifications of this invention will occur readily to those of ordinary skill in the art in view of these teachings. For instance, the MR material layer 338 may be deposited directly on top of the first gap layer 314 in FIG. 26 in lieu of depositing on top of the first lead layer 332 in FIG. 33. With this option ion milling would be implemented in FIG. 28 to remove a portion of the MR material layer before forming layers 330 and 332. Therefore, this invention is to be limited only by the following claims, which include all such embodiments and modifications when viewed in conjunction with the above specification and accompanying drawings.

We claim:

1. A magnetic read head with an air bearing surface (ABS), comprising:

a magnetoresistive (MR) sensor bounded by an ABS edge and a recessed edge and first and second side edges, the ABS edge being located at the ABS, the recessed edge being recessed from the ABS, and the first and second side edges being substantially perpendicular to the ABS;

first and second insulative gap layers;

the MR sensor being sandwiched directly between the first and second gap layers;

first and second lead layers, each of said lead layers having an end edge;

the end edge of each of the first and second lead layers being immediately adjacent a respective one of the first and second side edges of the MR sensor so as to form a contiguous junction therewith;

the first and second lead layers defining first and second lead layer sites;

first and second insulation layers located at substantially only each of said first and second lead layer sites;

the MR sensor having an antiferromagnetic dielectric layer that extends beyond the MR sensor and being located within each of the first and second lead layer sites directly on the first gap layer;

at each lead layer site, said first insulation layer being located directly on the antiferromagnetic dielectric layer; and a portion of each of the first and second lead layers being sandwiched directly between the first and second insulation layers.

2. A magnetic read head as claimed in claim 1 wherein at each lead layer site the antiferromagnetic layer is NiO.

3. A magnetic read head as claimed in claim 1 wherein each of the first and second lead layers comprise at least first and second lead layer films that are electrically connected together.

4. A magnetic read head as claimed in claim 3 further including:

at each of the first and second lead layer sites, each of the first and second lead layer films and the first and second insulation layers being bounded by first and second surfaces and first and second side edges; and at each of the first and second lead layer sites, a third insulation layer covering the first and second side edges of each of the first and second lead layer films, the side edges of each of the first and second insulation layers and a portion of the second surface of the first lead layer film, but covering less than a majority of the second surface of the second insulation layer.

5. A magnetic read head as claimed in claim 4 further including:

at each lead layer site, the first and second lead layer films overlapping one another with the first lead layer film having an extended portion that extends from the overlapping beyond the second lead layer film; and for each lead layer site, the extended portion of the first lead layer film being sandwiched between the first and third insulation layers and the first and third insulation layers being sandwiched between the first and second gap layers.

6. A magnetic read head as claimed in claim 5 further including:

at each lead layer site, the first lead layer film being closer to the first gap layer than the second lead layer film; and at each lead layer site, each of the first and second lead layer films having an end edge that forms said end edge of the respective lead layer and is connected to a respective one of the sensor side edges to form a contiguous junction therewith.

7. A magnetic read head as claimed in claim 4 further including:

at each lead layer site, the first lead layer film being closer to the first gap layer film than the second lead layer film; and at each lead layer site, each of the first and second lead layer films having an end edge that forms said end edge of the respective lead layer and is connected to a respective one of the sensor side edges to form a contiguous junction therewith.

8. A magnetic read head as claimed in claim 7 further including:

at each lead layer site, the first insulation layer being closer to the first gap layer than the second lead layer film; and at each lead layer site, the first insulation layer being substantially aligned with the MR sensor and an end edge of the first insulation layer and the end edge of the first lead layer film being spaced from a respective sensor side edge.

9. A magnetic read head as claimed in claim 8 further including:

at each lead layer site, the first and second lead layer films overlapping one another with the first lead layer having an extended portion that extends from the overlapping beyond the second lead layer film; and for each lead layer site, the extended portion of the first lead layer film being sandwiched between the first and third insulation layers and the first and third insulation layers being sandwiched between the first and second gap layers.

10. A magnetic read head as claimed in claim 9 wherein the second gap layer is located directly on the MR sensor and on the second and third insulation layers at each of the first and second lead layer sites.

11. A magnetic read head as claimed in claim 10 further including:

the MR sensor having an antiferromagnetic dielectric layer that extends beyond the MR sensor and being located within each of the first and second lead layer sites directly on the first gap layer; and at each lead layer site, said first insulation layer being located directly on the antiferromagnetic dielectric layer.

12. A magnetic read head as claimed in claim 11 further including:

for each lead layer site, the first and second side edges of the second lead layer film being slightly inboard of the first and second side edges of the first lead layer film.

13. A magnetic read head as claimed in claim 12 wherein at each lead layer site the antiferromagnetic layer is NiO.

14. A magnetic read head as claimed in claim 13 further including:

at each lead layer site, a silicon dioxide layer sandwiched between the third insulation layer and each of the first and second side edges of the second lead layer film.

15. A magnetic disk drive with an air bearing surface (ABS) comprising:

a read head including:

a magnetoresistive (MR) sensor bounded by an ABS edge and a recessed edge and first and second side edges, the ABS edge being located at the ABS, the recessed edge being recessed from the ABS and the first and second side edges being substantially perpendicular to the ABS;

first and second insulative gap layers;

the MR sensor being sandwiched directly between the first and second gap layers;

first and second lead layers, each of said lead layers having an end edge;

each of the first and second lead layers comprise at least first and second lead layer films that are electrically connected together;

the end edge of each of the first and second lead layers being immediately adjacent a respective one of the first and second side edges of the MR sensor so as to form contiguous junction therewith;

the first and second lead layers defining first and second lead layer sites;

first and second insulation layers located at substantially only each of said first and second lead layer sites;

a portion of each of the first and second lead layers being sandwiched directly between the first and second insulation layers;

at each of the first and second lead layer sites, each of the first and second lead layer films and the first and second insulation layers being bounded by first and second surfaces and first and second side edges; and at each of the first and second lead layer sites, a third insulation layer covering the first and second side edges of each of the first and second lead layer films, the side edges of each of the first and second insulation layers and a portion of the second surface of the first lead layer film, but covering less than a majority of the second surface of the second insulation layer a write head including:
   at least one coil layer and an insulation stack;
   the coil layer being embedded in the insulation stack;
   first and second pole pieces connected at a back gap and having pole tips with edges forming a portion of the ABS;
   the insulation stack being sandwiched between the first and second pole pieces; and
   a write gap layer sandwiched between the pole tips of the first and second pole pieces and forming a portion of the ABS;

the read head and the write head being adjacent one another to form a combined magnetic head;

a frame;

a magnetic disk rotatably supported on the frame;

a support mounted on the frame for supporting the head in a transducing relationship with the magnetic disk;

means for rotating the magnetic disk;

positioning means connected to the support for moving the combined magnetic head to multiple positions with respect to said magnetic disk; and means connected to the combined magnetic head, to the means for rotating the magnetic disk and to the positioning means for exchanging signals with the combined magnetic head, for controlling movement of the magnetic disk and for controlling the position of the combined magnetic head.

16. A magnetic disk drive as claimed in claim 15 further including:
   at each lead layer site, the first and second lead layer films overlapping one another with the first lead layer film having an extended portion that extends from the overlapping beyond the second lead layer film; and
   for each lead layer site, the extended portion of the first lead layer film being sandwiched between the first and third insulation layers and the first and third insulation layers being sandwiched between the first and second gap layers.

17. A magnetic disk drive as claimed in claim 16 further including:
   at each lead layer site, the first lead layer film being closer to the first gap layer than the second lead layer film; and
   at each lead layer site, each of the first and second lead layer films having an end edge that forms said end edge of the respective lead layer and is connected to a respective one of the sensor side edges to form a contiguous junction therewith.

18. A magnetic disk drive as claimed in claim 17 further including:
   at each lead layer site, the first insulation layer being closer to the first gap layer than the second lead layer film; and
   at each lead layer site, the first insulation layer being substantially aligned with the MR sensor and an end edge of the first insulation layer and the end edge of the first lead layer film being spaced from a respective sensor side edge.

19. A magnetic disk drive as claimed in claim 18 wherein the second gap layer is located directly on the MR sensor and on the second and third insulation layers at each of the first and second lead layer sites.

20. A magnetic disk drive as claimed in claim 19 further including:
   the MR sensor having an antiferromagnetic dielectric layer that extends beyond the MR sensor and being located within each of the first and second lead layer sites directly on the first gap layer; and
   at each lead layer site, said first insulation layer being located directly on the antiferromagnetic dielectric layer.

21. A magnetic disk drive as claimed in claim 20 wherein at each lead layer site the antiferromagnetic layer is NiO.

* * * * *